(12) United States Patent
Kobayashi

(10) Patent No.: US 8,860,784 B2
(45) Date of Patent: Oct. 14, 2014

(54) IMAGE PROCESSING APPARATUS, IMAGE PROCESSING METHOD, AND PROGRAM

(75) Inventor: Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 12/535,431

(22) Filed: Aug. 4, 2009

(65) Prior Publication Data

US 2010/0033554 A1   Feb. 11, 2010

(30) Foreign Application Priority Data

Aug. 6, 2008  (JP) ................................ P2008-203614
May 28, 2009  (JP) ................................ P2009-128578

(51) Int. Cl.
*H04N 13/00*    (2006.01)
*H04N 13/04*    (2006.01)
*H04N 13/02*    (2006.01)

(52) U.S. Cl.
CPC ......... *H04N 13/0422* (2013.01); *H04N 13/026* (2013.01)
USPC .......................................................... 348/43

(58) Field of Classification Search
CPC .................. G06T 7/0075; G06T 15/20; G06T 2207/10012; H04N 13/0022; H04N 13/0055; H04N 2013/0081
USPC ................................ 348/43; 345/419; 386/154
See application file for complete search history.

(56) References Cited

U.S. PATENT DOCUMENTS

| | | | | |
|---|---|---|---|---|
| 4,870,600 A | * | 9/1989 | Hiraoka | ........................ 345/419 |
| 5,255,190 A | * | 10/1993 | Sznaider | ........................... 702/3 |
| 5,717,415 A | | 2/1998 | Iue et al. | |
| 6,163,337 A | * | 12/2000 | Azuma et al. | ................... 348/43 |
| 6,304,286 B1 | * | 10/2001 | Shirai et al. | ...................... 348/51 |
| 6,384,859 B1 | | 5/2002 | Matsumoto et al. | |
| 6,445,833 B1 | | 9/2002 | Murata et al. | |
| 6,466,255 B1 | | 10/2002 | Kagita et al. | |

(Continued)

FOREIGN PATENT DOCUMENTS

| | | |
|---|---|---|
| EP | 0735512 | 10/1996 |
| JP | 6-194602 | 7/1994 |

(Continued)

OTHER PUBLICATIONS

Leonid Sigal, et al.; "Skin Color-Based Video Segmentation Under Time-Varying Illumination", IEEE Transactions on Pattern Analysis and Machine Intelligence, vol. 26, No. 7, pp. 862-877, (Jul. 2004).

(Continued)

*Primary Examiner* — Dave Czekaj
*Assistant Examiner* — Leron Beck
(74) *Attorney, Agent, or Firm* — Finnegan Henderson Farabow Garrett & Dunner LLP

(57) ABSTRACT

A image processing apparatus including: an image input section inputting a two-dimensional image signal; an image conversion section inputting an image signal output from the image input section, and generating and outputting images for right and left eyes for allowing binocular stereovision; and an image output section outputting the images for right and left eyes output from the image conversion section, wherein the image conversion section extracts a spatial feature quantity of the input image signal, and performs image conversion processing conducting enhancement processing applying the feature quantity to the input image signal so that either an image for a right eye or an image for a left eye is generated.

15 Claims, 19 Drawing Sheets

(56) References Cited

U.S. PATENT DOCUMENTS

| | | | |
|---|---|---|---|
| 6,553,184 B1 | 4/2003 | Ando et al. | |
| 6,584,219 B1* | 6/2003 | Yamashita et al. | 382/154 |
| 6,950,751 B2* | 9/2005 | Knobloch | 702/16 |
| 6,956,964 B2* | 10/2005 | Lee et al. | 382/154 |
| 7,292,268 B2* | 11/2007 | Hyodo et al. | 348/207.2 |
| 7,623,111 B2* | 11/2009 | Ioki et al. | 345/102 |
| 2003/0048393 A1* | 3/2003 | Sayag | 349/5 |
| 2003/0156188 A1* | 8/2003 | Abrams, Jr. | 348/51 |
| 2004/0105074 A1* | 6/2004 | Soliz et al. | 351/206 |
| 2006/0008173 A1* | 1/2006 | Matsugu et al. | 382/274 |
| 2007/0024614 A1 | 2/2007 | Tam et al. | |
| 2007/0053607 A1* | 3/2007 | Mitsunaga | 382/274 |
| 2007/0109660 A1* | 5/2007 | Hayashi | 359/675 |
| 2009/0116732 A1 | 5/2009 | Zhou et al. | |

FOREIGN PATENT DOCUMENTS

| | | |
|---|---|---|
| JP | 8-30806 | 2/1996 |
| JP | 08-063615 A | 3/1996 |
| JP | 9-107562 | 4/1997 |
| JP | 09-116930 A | 5/1997 |
| JP | 10-51812 | 2/1998 |
| JP | 11-098534 A | 4/1999 |
| JP | 2000-092516 A | 3/2000 |
| JP | 2000-209614 | 7/2000 |
| JP | 2000-261828 A | 9/2000 |
| JP | 2001-320731 A | 11/2001 |
| JP | 2005-151534 | 6/2005 |
| WO | WO 2007-148219 | 12/2007 |

OTHER PUBLICATIONS

English-language search report from the European Patent Office for corresponding European Application No. EP 09 25 1934.

Japanese Office Action issued in Japanese Patent Application No. 2009-128578, mailed Nov. 27, 2012.

* cited by examiner

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program. In particular, the present invention relates to an image processing apparatus, an image processing method, and a program which perform image conversion on a two-dimensional image to generate a binocular disparity image capable of stereovision.

2. Description of the Related Art

To date, various proposals have been made of an apparatus and method for converting a two-dimensional image into a binocular disparity image capable of stereovision. A binocular disparity image generated on the basis of a two-dimensional image includes a pair of images for right and left eyes, observed by a right eye and by a left eye, respectively. An observer can perceive an image as a stereoscopic image by the presentation of the binocular disparity image including a pair of the images for a right eye and for a left eye using a display apparatus capable of presenting an image for a right eye and an image for a left eye separately to the observer's right eye and left eye, respectively.

Related-art techniques that have been disclosed on the generation and the display processing of such an image include the following.

For example, Japanese Unexamined Patent Application Publication No. 9-107562 has disclosed an image processing configuration for a moving image having motion in a horizontal direction. Specifically, in the image processing configuration, an original image is output to one of the images for a right eye or a left eye, and an image having a delay for each field is output to the other of the images. By such image output control, the technique allows a user to perceive an object moving horizontally to be nearer than the background.

Also, Japanese Unexamined Patent Application Publication No. 8-30806 has proposed an apparatus allowing a user to perceive that a still image or a moving image having little motion stands out by shifting the image for a right eye from the image for a left eye by a predetermined amount in the horizontal direction.

Also, Japanese Unexamined Patent Application Publication No. 10-51812 has proposed a method in which an image is divided into a plurality of disparity calculation areas, a pseudo depth is calculated for each of the areas from the feature quantity of the image, and the image for a right eye is horizontally shifted from the image for a left eye in the opposite direction on the basis of the depth.

Also, in the same manner as Japanese Unexamined Patent Application Publication No. 10-51812, Japanese Unexamined Patent Application Publication No. 2000-209614 has made a proposal to prevent eye fatigue by restricting the amount of delay in the horizontal direction while changing the amount of delays in the horizontal direction of the image for a right eye and the image for a left eye on the basis of the amount of delay calculated from the feature quantity of an image so as not to generate the binocular disparity more than necessary.

Further, Japanese Unexamined Patent Application Publication No. 2005-151534 has proposed a method in which the feature quantities of the upper section and the lower section of an image are calculated, a combination ratio of a plurality of scene structures representing depth information provided in advance is adjusted so that an image is expressed by a combination of simple structures.

The above-described related-art techniques have the problems described below.

The image conversion apparatus described in Japanese Unexamined Patent Application Publication No. 9-107562 allows only an object moving horizontally at a constant speed to be viewed stereoscopically. Binocular disparity is not correctly set for an image including a plurality of moving subjects and an image including complicated motion, and an object is placed at an unnatural position, and the retinal disparity becomes too large, thereby a stereovision is considered not to be formed.

Also, in the image conversion apparatus described in Japanese Unexamined Patent Application Publication No. 8-30806, the entire screen is only shifted for a still image or a moving image having little motion, and thus it is not possible to express a front-behind relationship between objects in the image.

In the image conversion apparatus described in Japanese Unexamined Patent Application Publication Nos. 10-51812 and 2000-209614, a pseudo depth is estimated from the feature quantity of the image. However, the estimation is based on the assumption that an object at the front of the screen has a high sharpness, a high brightness, and a high saturation, and thus the estimation is not necessarily correct. Accordingly, an incorrect retinal disparity is given to an object whose depth is incorrectly estimated, and thus the object is placed at a wrong position.

In the image conversion apparatus described in Japanese Unexamined Patent Application Publication No. 2005-151534, the structure of an image is applied to a relatively simple finite structure, and thus the occurrence of unnatural depth is restrained. However, there is a problem, being common to all the related-art methods, that relatively large retinal disparity occurs in the generated binocular disparity image. The binocular disparity image is stereoscopically displayed using a stereoscopic display apparatus. In general, an observer uses a stereoscopic display apparatus for observing an image with a pair of special glasses, such as passive glasses separating an image into images for right and left eyes, respectively, by a polarization filter or a color filter, or an active glasses separating an image into images for right and left eyes in time by liquid crystal shutters.

When viewing a binocular disparity image having large retinal disparity, an observer can perceive stereoscopic effect in accordance with the retinal disparity in a state of wearing such glasses for stereovision. However, when the observer views a screen without the glasses, the images for right and left eyes are seen as images overlapped with each other in a large way, making it difficult to be seen as a normal two-dimensional image. That is to say, the images converted by the related-art image conversion apparatuses have been appreciated only in a state of wearing the glasses.

Also, a large retinal disparity is considered to have an influence on the observer's fatigue. For example, in Japanese Unexamined Patent Application Publication No. 6-194602, a description has been given of the fact that if images for a right eye and a left eye have a large displacement, contradiction arises between the control of an angle of convergence and the adjustment of the crystalline lens in the way of seeing in a real world, and the contradiction leads to fatigue in stereovision using binocular disparity.

Also, in the image conversion apparatus described in Japanese Unexamined Patent Application Publication Nos. 10-51812, 2000-209614, and 2005-151534, a pseudo depth is estimated from an image. However, it is difficult to detect a detailed depth from one image. For example, it is not easy to estimate a depth of a minute structure, such as a branch of a tree, an electric wire, and a hair. Accordingly, it has not been possible to give stereoscopic effect on these minute subjects.

SUMMARY OF THE INVENTION

The present invention addresses the above-described problems, for example, and restrains the occurrence of wrong stereoscopic effect due to incorrect estimation of a depth. Thereby, the present invention makes it possible to reconstruct an original image or an image near to the original image when the images for right and left eyes are combined. That is to say, it is desirable to provide an image processing apparatus, an image processing method, and a program which allow an observer to appreciate a normal two-dimensional image in a state of not wearing stereovision-enabled glasses, and at the same time, achieve the generation and the presentation of a binocular disparity image giving little fatigue to the observer.

According to an embodiment of the present invention, there is provided an image processing apparatus including: an image input section inputting a two-dimensional image signal; an image conversion section inputting an image signal output from the image input section, and generating and outputting images for right and left eyes for allowing binocular stereovision; and an image output section outputting the images for right and left eyes output from the image conversion section, wherein the image conversion section extracts a spatial feature quantity of the input image signal, and performs image conversion processing conducting enhancement processing applying the feature quantity to the input image signal so that either an image for a right eye or an image for a left eye is generated.

Further, in the image processing apparatus according to an embodiment of the present invention, the image conversion section may extract a differential luminance signal of the input image signal, may set the differential luminance signal as the feature quantity, may generate a converted signal produced either by adding the feature quantity to the input image signal or by subtracting the feature quantity from the input image signal as an image signal for a right eye or an image signal for a left eye, and may output a non-converted signal being the direct input image signal as an image signal for a different one of the eyes from the eye for which the converted signal is produced.

Further, in the image processing apparatus according to an embodiment of the present invention, the image conversion section may extract a differential luminance signal of the input image signal, may set the differential luminance signal as the feature quantity, may generate signals by adding the feature quantity to the input image signal and by subtracting the feature quantity from the input image signal, respectively, and may generate a pair of the two signals as a pair of images for a right eye and for a left eye.

Further, in the image processing apparatus according to an embodiment of the present invention, the image conversion section may extract a differential luminance signal of the input image signal, may set a signal produced by non-linearly converting the differential luminance signal as the feature quantity, may generate a signal by adding the feature quantity to the input image signal or by subtracting the feature quantity from the input image signal, and may produce either of the signals as an image signal for a right eye or an image signal for a left eye.

Further, in the image processing apparatus according to an embodiment of the present invention, the image conversion section may include an edge-area detection section detecting an edge area of the input image signal, an enhancement control section performing feature quantity modification reducing the feature quantity on the edge area detected by the edge-area detection section, and an image combining section applying the modified feature quantity generated by the enhancement control section and conducting enhancement processing reducing an enhancement processing level of the edge area.

Further, in the image processing apparatus according to an embodiment of the present invention, the image conversion section may include a flesh-colored area detection section detecting a flesh-colored area of the input image signal, an enhancement control section performing feature quantity modification reducing the feature quantity on the flesh-colored area detected by the flesh-colored area detection section, and an image combining section applying the modified feature quantity generated by the enhancement control section and conducting enhancement processing reducing an enhancement processing level of the flesh-colored area.

Further, in the image processing apparatus according to an embodiment of the present invention, wherein the image conversion section may extract a differential luminance signal of the input image signal, may set the differential luminance signal as a first feature quantity, may generate a converted signal produced either by adding the first feature quantity to the input image signal or by subtracting the first feature quantity from the input image signal as a luminance image signal for a right eye or an image signal for a left eye, may extract a differential color-difference signal of the input image signal, may set the differential color-difference signal as a second feature quantity, may generate a converted signal produced either by adding the second feature quantity to the input image signal or by subtracting the second feature quantity from the input image signal as a color-difference signal for a right eye or an image for a left eye, and may output a non-converted signal being the direct input image signal as an image for a different one of the eyes from the eye for which the converted signal is produced.

Further, in the image processing apparatus according to an embodiment of the present invention, the image conversion section may extract a differential luminance signal of the input image signal, may set the differential luminance signal as a first feature quantity, may generate signals by adding the first feature quantity to the input image signal and by subtracting the first feature quantity from the input image signal, respectively, may produce a pair of the two signals as a pair of luminance signals of an image for a right eye and an image for a left eye, may extract a differential color-difference signal of the input image signal, may set the differential color-difference signal as a second feature quantity, generates signals by adding the second feature quantity to the input image signal and by subtracting the second feature quantity from the input image signal, and may produce a pair of the two signals as a pair of color difference signals of an image for a right eye and an image for a left eye.

Further, in the image processing apparatus according to an embodiment of the present invention, the image conversion section may perform processing generating an image for a right eye and an image for a left eye for each frame included in a moving image.

Further, the image processing apparatus according to an embodiment of the present invention may further include an image output section outputting the images for right and left eyes, generated by the image conversion section, wherein the image output section may output the image for a right eye and the image for a left eye, generated by the image conversion section alternately at a speed two times an input-image frame rate.

Further, in the image processing apparatus according to an embodiment of the present invention, the image conversion section may alternately generate either an image for a right eye or an image for a left eye for each frame included in a moving image.

Further, in the image processing apparatus according to an embodiment of the present invention, the image conversion section may generate an image for a right eye and an image for a left eye for each frame included in a moving image, and may perform generation processing of a binocular disparity image alternately including line data included in the generated images for right and left eyes.

Further, in the image processing apparatus according to an embodiment of the present invention, the image conversion section may perform generation processing of an image for a right eye and an image for a left eye so as to set a sum signal of the image for a right eye and the image for a left eye equal to, or substantially equal to the input signal.

Further, the image processing apparatus according to an embodiment of the present invention may further include an image display section displaying the image generated by the image conversion section.

Further, in the image processing apparatus according to an embodiment of the present invention, the image display section may perform time-division stereoscopic display processing alternately outputting the image for a right eye and the image for a left eye.

Further, in the image processing apparatus according to an embodiment of the present invention, when the image display section performs time-division stereoscopic display processing alternately outputting the image for a right eye and the image for a left eye, the image display section may switch the display such that switching timing of outputting the image for a right eye and the image for a left eye is synchronized with switching of shutters of right and left glasses worn by an observer of the image.

Further, in the image processing apparatus according to an embodiment of the present invention, the image display section may have a configuration in which a polarizing filter whose polarization direction is set different for each horizontal line is attached on a front surface of the display section, and may display a binocular disparity image including line data alternately forming the image for a right eye and the image for a left eye generated by the image conversion section.

According to another embodiment of the present invention, there is provided an image processing apparatus including: an image input section inputting a two-dimensional image signal; an image conversion section inputting an image signal output from the image input section, and generating and outputting an image for a right eye or an image for a left eye for allowing stereoscopic vision; and an image output section outputting the images for right and left eyes output from the image conversion section, wherein the image conversion section performs generation processing of the image for a right eye and the image for a left eye so as to set a sum signal of the image for a right eye and the image for a left eye equal to, or substantially equal to, the input signal.

According to another embodiment of the present invention, there is provided a method of processing an image in an image processing apparatus, including the steps of: inputting the image by an image input section inputting a two-dimensional image signal; converting the image by an image conversion section inputting the image signal output from the image input section, and generating and outputting images for right and left eyes for allowing binocular stereovision; and outputting the image by an image output section outputting the images for right and left eyes output from the image conversion section, wherein the step of converting the image extracts a spatial feature quantity of the input image signal, and performs image conversion processing conducting enhancement processing applying the feature quantity to the input image signal so that either the image for a right eye or the image for a left eye is generated.

According to another embodiment of the present invention, there is provided a program for causing an image processing apparatus to perform image processing including the steps of: inputting an image by an image input section inputting a two-dimensional image signal; converting the image by an image conversion section inputting the image signal output from the image input section, and generating and outputting images for right and left eyes for allowing binocular stereovision; and outputting the image by an image output section outputting the images for right and left eyes output from the image conversion section, wherein the step of converting the image extracts a spatial feature quantity of the input image signal, and performs image conversion processing conducting enhancement processing applying the feature quantity to the input image signal so that either the image for a right eye or the image for a left eye is generated.

In this regard, a computer program of the present invention is a computer program capable of being provided through a storage medium and a communication medium in a computer readable format, for example, to a general-purpose computer system performing various kinds of program code. By providing such a program in a computer readable format, the processing in accordance with the program is performed on a computer system.

Other and further objects, features and advantages of the present invention will become apparent by the detailed description based on the following embodiments of the present invention and the accompanying drawings. In this regard, in this specification, a system is a logical set of a plurality of apparatuses, and is not limited to a set of constituent apparatuses that are contained in a same casing.

By an embodiment of the present invention, in the configuration in which a two-dimensional image signal is input, and images for a right eye and for a left eye are generated in order to achieve binocular stereovision, the image conversion section extracts a spatial feature quantity of the input signal, and performs image conversion processing conducting enhancement processing using the feature quantity on the input image signal so that an image for a right eye and an image for a left eye are generated. Specifically, the differential luminance signal of the input image signal or a signal produced by non-linearly converting the differential luminance signal is determined to be the feature quantity. Two signals are produced by adding the feature quantity to the input image signal and by subtracting the feature quantity from the input image signal, and a pair of the two signals are generated as a pair of images for a right eye and for a left eye. With this configuration, it becomes possible to generate an image capable of stereovision by simple signal processing. Also, the sum signal of the images for a right eye and for a left eye becomes equal to the input signal. Thus, when a user observes the image without wearing stereoscopic glasses, it becomes possible for the user to view the image as a usual two-dimensional image.

DESCRIPTION OF THE PREFERRED EMBODIMENTS

In the following, a detailed description will be given of an image processing apparatus, an image processing method, and a program according to an embodiment of the present invention with reference to the drawings. The description will be given in accordance with the following items.

1. Image processing apparatus according to a first embodiment of the present invention
 1.1 Overview of the configuration and the processing of an image processing apparatus according to the present invention
 1.2 Examples of the configuration and output of the images, for right and left eyes, generated by an image processing apparatus according to the present invention
 1.3 About retinal disparity of the images, for right and left eyes, generated by an image processing apparatus according to the present invention
 1.4 About processing sequence of the image conversion section of an image processing apparatus according to the present invention
2. Image processing apparatus, according to a second embodiment of the present invention, including detection of a specific image area and the control processing
3. Image processing apparatus, according to a third embodiment of the present invention, generating right and left image signals corresponding to a color difference signal
4. Example of the configuration of an image processing apparatus having an image display section

1. Image Processing Apparatus According to a First Embodiment of the Present Invention First, a description will be given of a first embodiment of the present invention with reference to FIG. 1 and the other figures.

Figure 1:
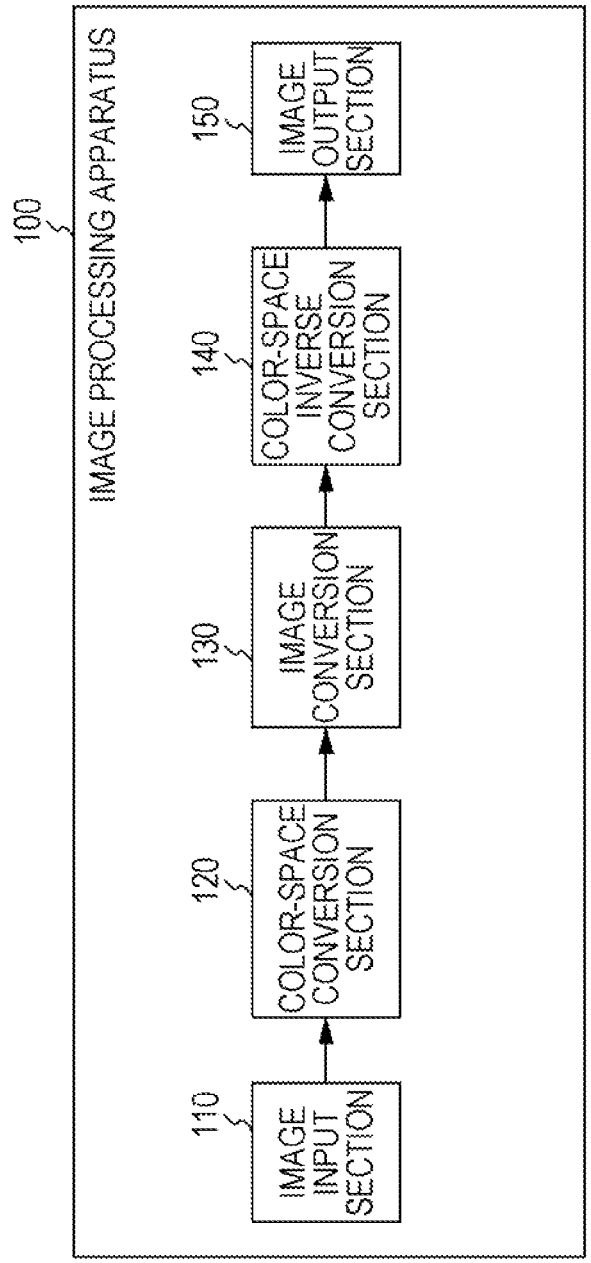
FIG. 1 is a diagram illustrating an example of a configuration of an image processing apparatus according to an embodiment of the present invention.

1.1 Overview of the Configuration and the Processing of an Image Processing Apparatus According to the Present Invention FIG. 1 is a diagram illustrating an image processing apparatus according to an embodiment of the present invention. In the image processing apparatus 100, an image input section 110 receives a still image file output from a digital still camera, etc., and moving image data output from a camcorder, etc., and converts the file and the data into an internal data format. Here, the internal data format is baseband moving image data, and is video data of the three primary colors, red (R), green (G), and blue (B), or video data including a luminance (Y) and color differences (Cb, Cr). The identification signal of a color space is overlaid on the internal data format, so that any color space may be used as long as a color-space conversion section 120 in the subsequent stage corresponds to the color space.

The video data output from the image input section 110 is input into the color-space conversion section 120, and is converted into a luminance signal and color difference signals. At this time, if the input video data conforms to the processing data of an image conversion section 130, for example, conforms to the Y, Cb, Cr color space, the color-space conversion section 120 outputs the data without performing the color-space conversion. If the input video data conforms to the R, G, B color space, or the other color spaces, the color-space conversion section 120 performs conversion to the luminance (Y) and the color difference (Cb, Cr) signals, and outputs the signals.

In this regard, the color space of the video data output from the color-space conversion section 120 is not limited to the Y, Cb, Cr color space. The color space may be any color space as long as the color space conforms to the processing data of the image conversion section 130, and a luminance component and a color component are separated. For example, the luminance signal (Y) and the color difference signals (U, V) may be used.

The video data output from the color-space conversion section 120 is input into the image conversion section 130. The image conversion section 130 generates binocular disparity images for a right eye and for a left eye by the processing described later, and combines these images in accordance with a stereoscopic display apparatus. That is to say, the image conversion section 130 extracts a spatial feature quantity of the input image signal, and performs different enhancement processing on the extracted feature quantity so as to generate the image for a right eye and the image for a left eye.

The video data output from the image conversion section 130 is input into a color-space inverse conversion section 140, and is converted from the Y, Cb, Cr color space to a color space in accordance with an output image format. At this time, if the output image format conforms to the Y, Cb, Cr color space, the color-space inverse conversion section 140 outputs the video data without performing the color space conversion. In this manner, FIG. 1 illustrates a configuration having the color-space conversion section 120 and the color-space inverse conversion section 140. However, these components are not indispensable, and may be omitted.

The video data output from the color-space inverse conversion section 140 is input into an image output section 150. The image output section 150 converts the video data into video data that can be received by a stereoscopic display apparatus externally connected and capable of achieving stereovision by displaying a binocular disparity image converted by the image conversion section 130.

In this regard, in the present embodiment, a description is given of a method in which a still image is input, and the image is converted into video data by the image input section 110. However, the present invention is not limited to this method. One still image may be converted into two images for a right eye and for a left eye, and a file of the two still images may be output to, for example, a memory card, etc.

Figure 2:
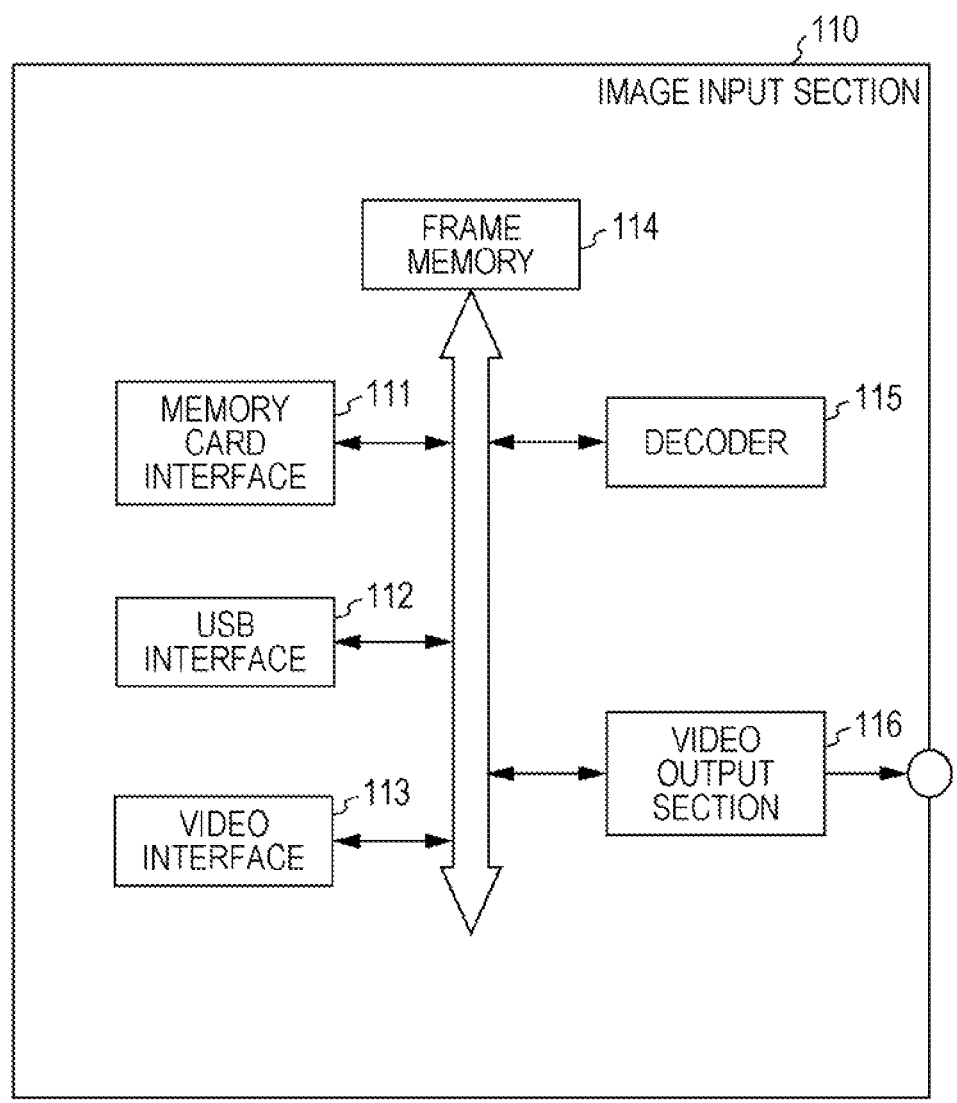
FIG. 2 is a diagram illustrating an example of the configuration of the image input section of an image processing apparatus according to an embodiment of the present invention.

FIG. 2 is a block diagram illustrating the configuration of the image input section 110 according to an embodiment. The image input section 110 includes a memory card interface 111 for inputting a still image file, etc., a USB interface 112 for directly connecting a video apparatus, a video interface 113 for inputting a video signal, a frame memory 114, a decoder 115, and a video output section 116.

Figure 3:
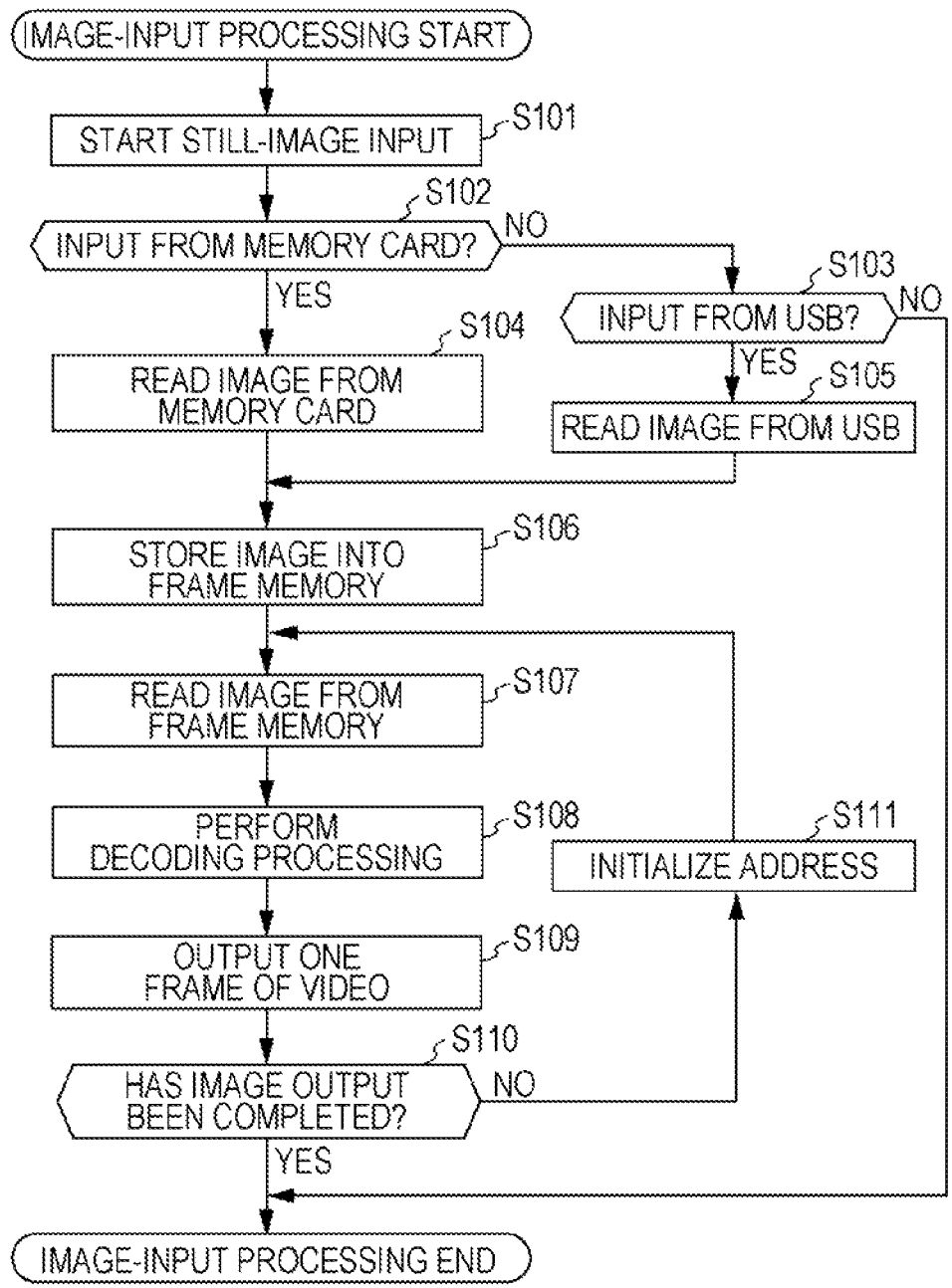
FIG. 3 is a flowchart illustrating a processing sequence in the case where an input image is a still image as a processing example of the image input section of an image processing apparatus according to an embodiment of the present invention.

As an example of the processing in the image input section 110, a description will be given the processing sequence of inputting a still image with reference to a flowchart in FIG. 3.

In step S101, the image input section 110 starts inputting a still image.

In step S102, the image input section 110 checks whether a memory card is inserted in the memory card interface 111, and determines whether the image data is to be input from the memory card. If a memory card is inserted, the processing proceeds to step S104, whereas if a memory card is not inserted, the processing proceeds to step S103.

In step S103, the image input section 110 checks whether an external apparatus capable of inputting a still image is connected to the USB interface 112, and determines whether the image data is to be input from the USB interface 112. If a USB apparatus is connected, the processing proceeds to step S105. If a USB apparatus is not connected, the image input processing is terminated.

Here, the determination of a medium from which the still image data is input may be specified by a method of instructing an input apparatus using an operation section not shown in the figure.

In step S104, the image input section 110 reads the image data from a still image file recorded in the memory card. At this time, the still image file in the memory card may be selected using the operation section not shown in the figure. Alternatively, the still image file may be automatically selected in the order determined on the basis of some criterion.

In step S105, the image input section 110 reads the still image data from the external apparatus connected to the USB interface. At this time, a still image file in the external apparatus may be selected using the operation section not shown in the figure. Alternatively, the still image file may be automatically selected in the order determined on the basis of some criterion.

In step S106, the image input section 110 stores the still image data that has been read in step S104 or in step S105 into the frame memory 114.

In step S107, the image input section 110 reads the still image data from the frame memory 114 under the control of the control section not shown in the figure. At this time, the read address indicates the beginning of the image data stored in step S106.

In step S108, the image input section 110 performs decoding processing of the still image. In general, still image data is compressed in accordance with the format specified by JPEG (Joint Photographic Experts Group), etc. Thus, the decoder 115 reconstructs the baseband image data by performing image expansion processing in accordance with the image format.

In step S109, the image input section 110 outputs the decoded still image data as one frame of video data. Here, the format of the video data conforms to the format output by the image output section 150. That is to say, if the image output section 150 outputs video data of the HD (High Definition) resolution and of 60 frames per second, the control section, not shown in the figure, generates a video synchronization signal of 60 frames per second, and the image output section 150 applies the still image data in a valid area of the signal, and outputs the signal.

In step S110, a determination is made on whether or not the image output section 150 has completed the image output processing. If the image output processing has been completed, the image input processing is terminated. If the image output processing has not been completed, the processing proceeds to step S111.

In step S111, the image input section 110 initializes the read address of the frame memory 114, and sets the read address to indicate the beginning of the still image data stored in step S106. When the address initialization in step S111 is completed, the processing proceeds to step S107, and the processing from step S107 to step S111 is repeated after that.

In this manner, if a still image is input, the image input section 110 performs conversion into video data having the same consecutive images.

Figure 4:
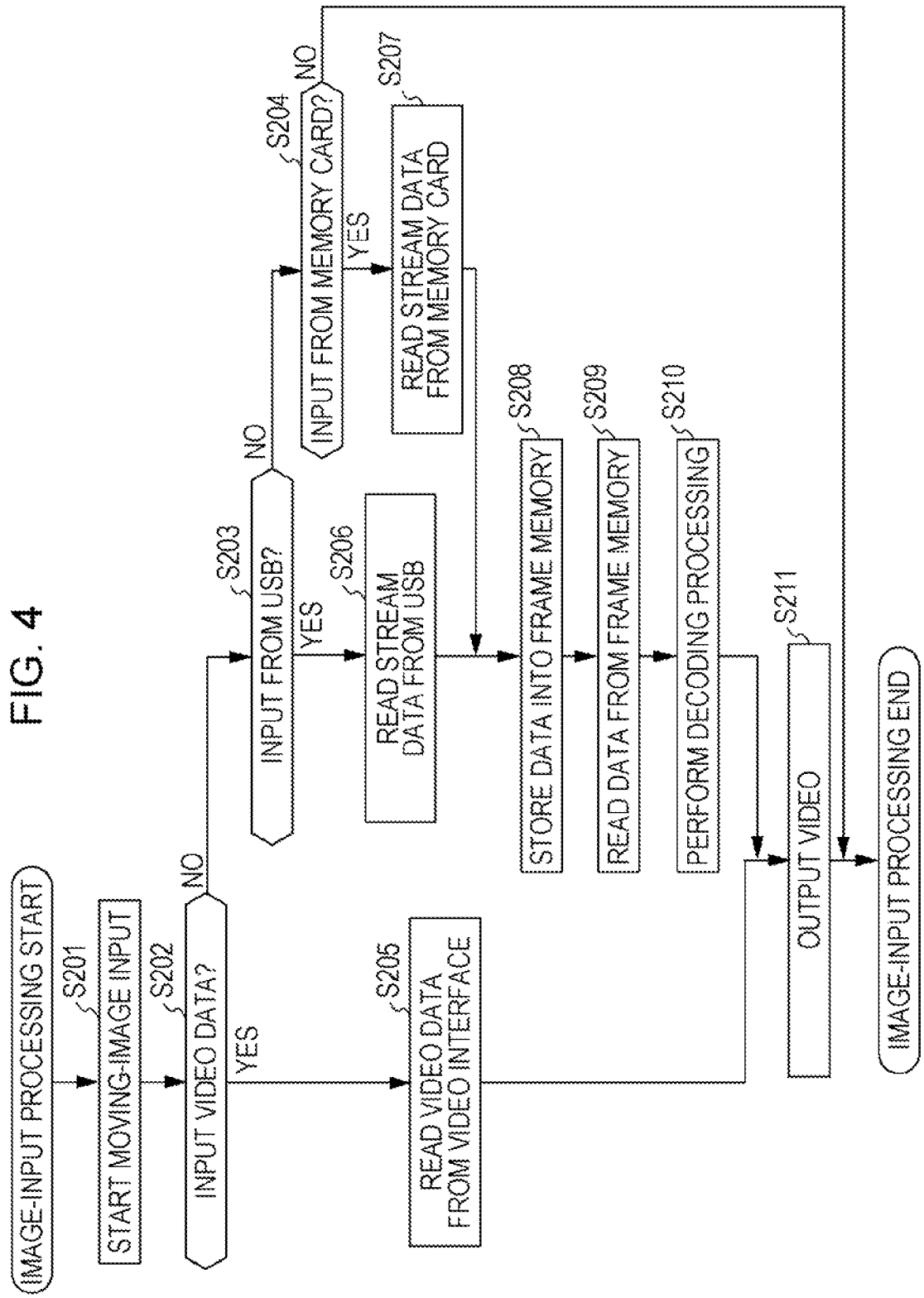
FIG. 4 is a flowchart illustrating a processing sequence in the case where an input image is a moving image as a processing example of the image input section of an image processing apparatus according to an embodiment of the present invention.

Next, as an example of the processing in the image input section 110, a description will be given the processing sequence of inputting a moving image with reference to a flowchart in FIG. 4.

In step S201, the image input section 110 starts inputting a moving image.

In step S202, the image input section 110 checks whether a video signal is input into the video interface 113, and determines whether the moving image data is to be input from the video interface. If the video signal is input, the processing proceeds to step S205, whereas if the video signal is not input, the processing proceeds to step S203.

In step S203, the image input section checks whether an external apparatus capable of inputting a moving image is connected to the USB interface 112, and determines whether moving image data is to be input from the USB interface 112. If a USB apparatus is connected, the processing proceeds to step S206. If a USB apparatus is not connected, the processing proceeds to step S204.

In step S204, the image input section 110 checks whether a memory card is inserted in the memory card interface 111, and determines whether moving image data is to be input from the memory card. If a memory card is inserted, the processing proceeds to step S207, whereas if a memory card is not inserted, the image input processing is terminated.

Here, the determination of a medium from which moving image data is input may be specified by a method of instructing an input apparatus using an operation section not shown in the figure.

In step S205, the image input section 110 reads video data from the video interface 113. A video signal transmitted by digital-video transmission, such as DVI (Digital Video Interface), HDMI (High-Definition Multimedia Interface), HDSDI (High-Definition Serial Digital Interface), etc., a video signal transmitted by analog-video transmission, such as NTSC (National Television Standards Committee), a component system, etc., are input into the image input section 110. If an analog-video signal is input, the video interface 113 converts the signal into a baseband signal by demodulation processing, and then the signal is converted into a digital signal by an A/D converter. On the other hand, if a digital-video signal is input, the video interface 113 converts the signal into a baseband signal by demodulation processing.

In step S206, the image input section 110 reads moving image data from the external apparatus connected to the USB interface 112. At this time, a moving image file in the external apparatus may be selected using the operation section not shown in the figure. Alternatively, a moving image file may be automatically selected in the order determined on the basis of some criterion.

In step S207, the image input section 110 reads image data from a moving image file recorded in the memory card. At this time, a moving image file in the memory card may be selected using the operation section not shown in the figure. Alternatively, a moving image file may be automatically selected in the order determined on the basis of some criterion.

Here, the moving image data input through the USB interface 112 and the moving image data recorded in the memory card are stream data compressed by a moving image compression system defined by MPEG (Moving Picture Experts Group), etc. In such a compression system, it is necessary to perform decoding processing using a frame memory, and thus the stream data is stored in the frame memory 114 in step 208.

In step S209, the image input section 110 reads the moving image data from the frame memory 114 under the control of the control section not shown in the figure.

In step S210, the image input section 110 performs decoding processing of the moving image. As described above, the moving image data recorded in the frame memory 114 is stream data compressed by MPEG, etc., and thus the decoder 115 performs image expansion processing in accordance with the image format to reconstruct video data of a baseband.

In step S211, the video output section 116 video-outputs either the video data output from the video interface 113 or the video data output from the decoder 115 in an internal data format.

Figure 5:
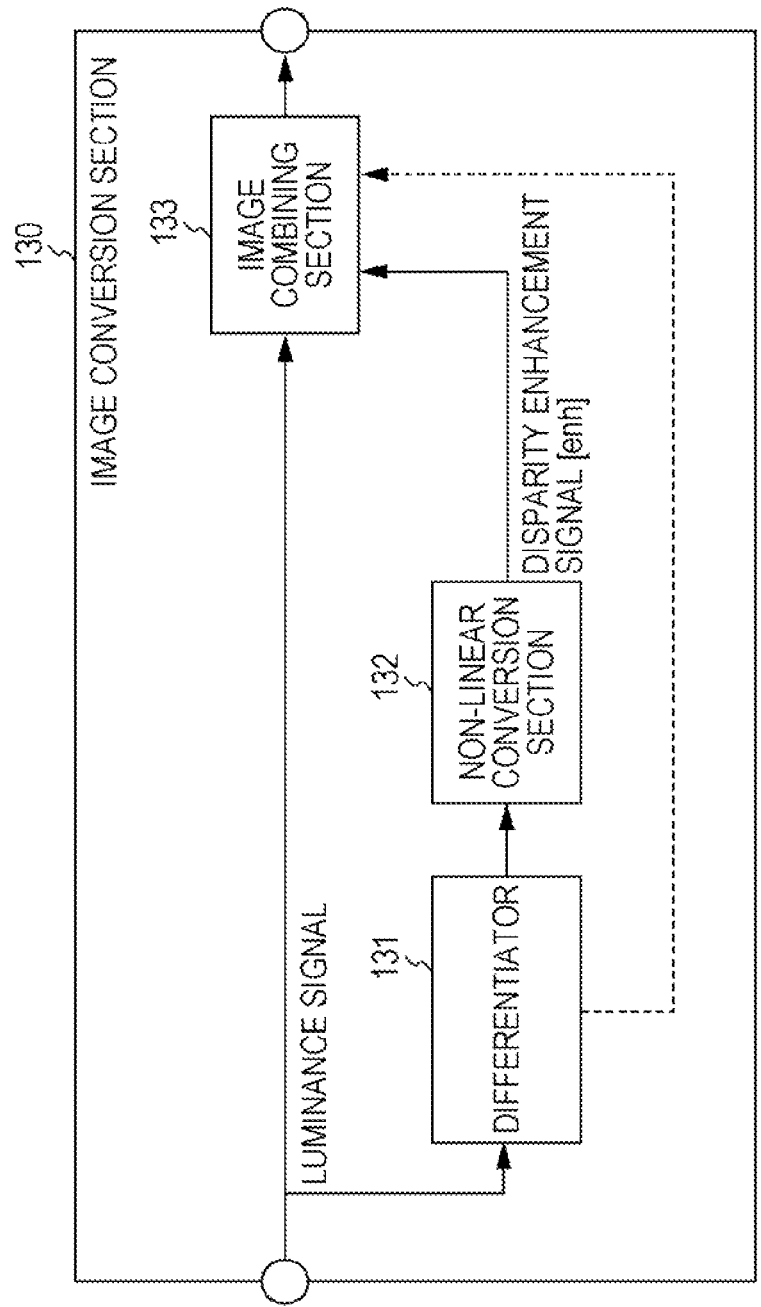
FIG. 5 is a diagram illustrating an example of the configuration of the image conversion section of an image processing apparatus according to an embodiment of the present invention.

FIG. 5 is a block diagram illustrating an example of the configuration of the image conversion section 130 according to an embodiment. The image conversion section 130 extracts a spatial feature quantity of the input image signal, and performs different enhancement processing on the extracted feature quantity so as to generate the image for a right eye and the image for a left eye. The image conversion section 130 includes a differentiator 131, a non-linear conversion section 132, and an image combining section 133.

The differentiator 131 extracts a luminance signal from the video data input into the image conversion section 130, and generates a differential signal of the luminance signal. Specifically, the luminance signal of the image is input horizontally, and the first derivative signal of the input luminance signal is generated. The first derivative processing uses, for example, a linear first derivative filter having three taps in the horizontal direction.

The non-linear conversion section 132 non-linearly converts the differential signal output from the differentiator 131, and generates and outputs a disparity enhancement signal [enh].

Figure 6:
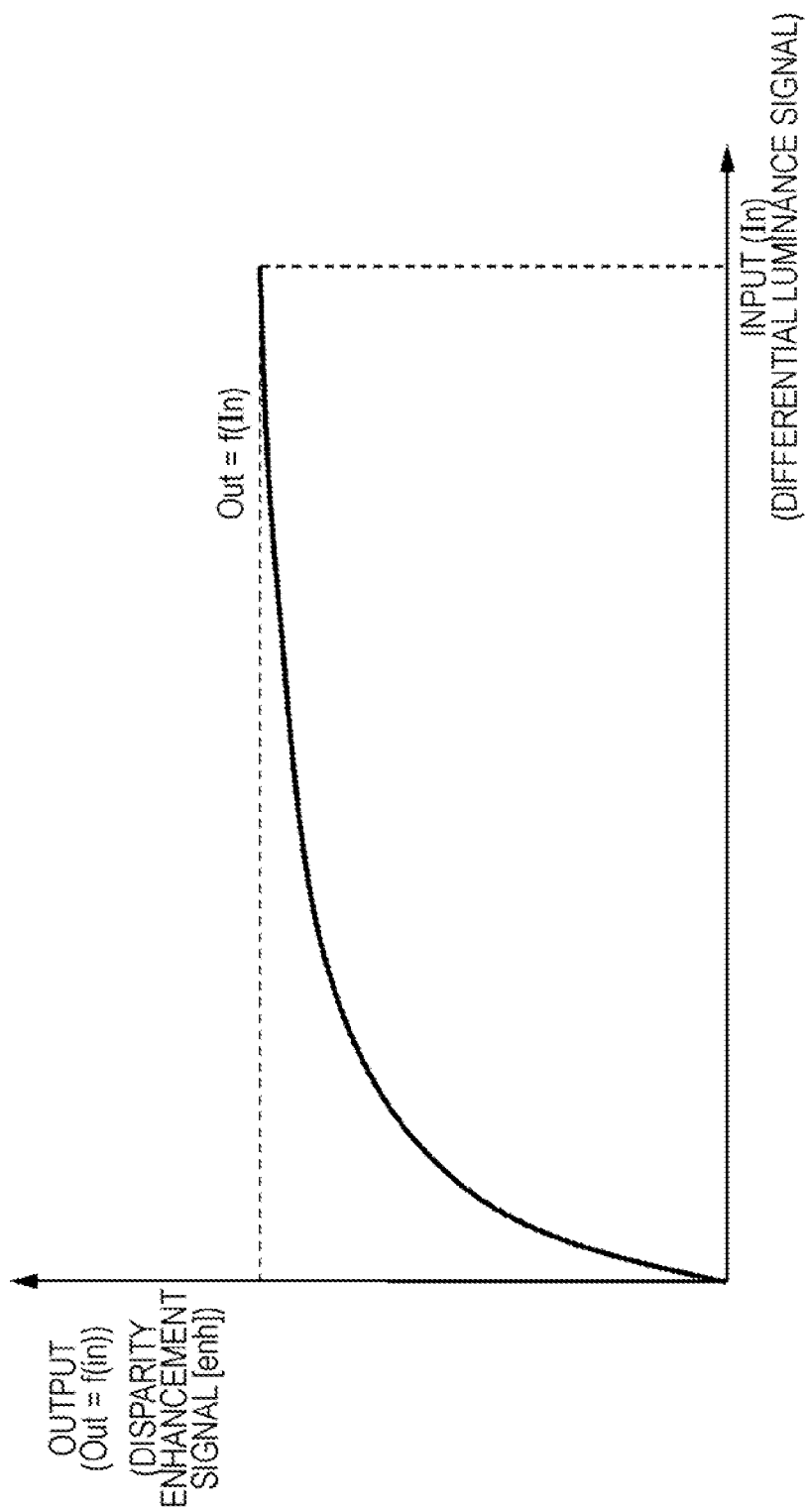
FIG. 6 is a diagram illustrating an example of the non-linear conversion processing on an image signal, which is executed by the image conversion section of an image processing apparatus according to an embodiment of the present invention.

FIG. 6 illustrates an example of the non-linear conversion processing performed in the non-linear conversion section 132. The horizontal axis shows the input signal from the differentiator 131, which is the differential luminance signal. The vertical axis shows the output of the non-linear conversion section 132 after the non-linear conversion processing. The non-linear conversion section 132 converts the input differential signal (In) by a predefined function f(x), and outputs a disparity enhancement signal [enh](Out). That is to say, Out=f(In). At this time, various settings can be used for the function f(x). For example, as an example of the function f(x), an exponential function as shown by the expression $$f(x)=x^\beta$$

is used, where $\beta$ is a preset coefficient, and various values can be set in the coefficient.

Also, the conversion function in the non-linear conversion section 132 is not limited to an exponential function, and linear conversion may be applied.

The image combining section 133 receives the disparity enhancement signal [enh] output from the non-linear conversion section 132 and the video data input into the image conversion section 130, combines each frame image included in the video data and the disparity enhancement signal, and performs processing generating images for a right eye and a left eye.

In this regard, as shown by a broken line in FIG. 5, the conversion processing of the non-linear conversion section 132 may be omitted, the differential signal generated by the differentiator 131 may be directly input into the image combining section 133, and the image combining section 133 may perform processing generating images for right and left eyes by applying the differential signal.

The image combining section 133 performs generation processing of images for right and left eyes using each frame image included in video data and a spatial feature quantity generated from the frame image, that is to say, the differential signal of the luminance signal or the disparity enhancement signal [enh] generated by non-linearly converting the differential signal.

Figure 7:
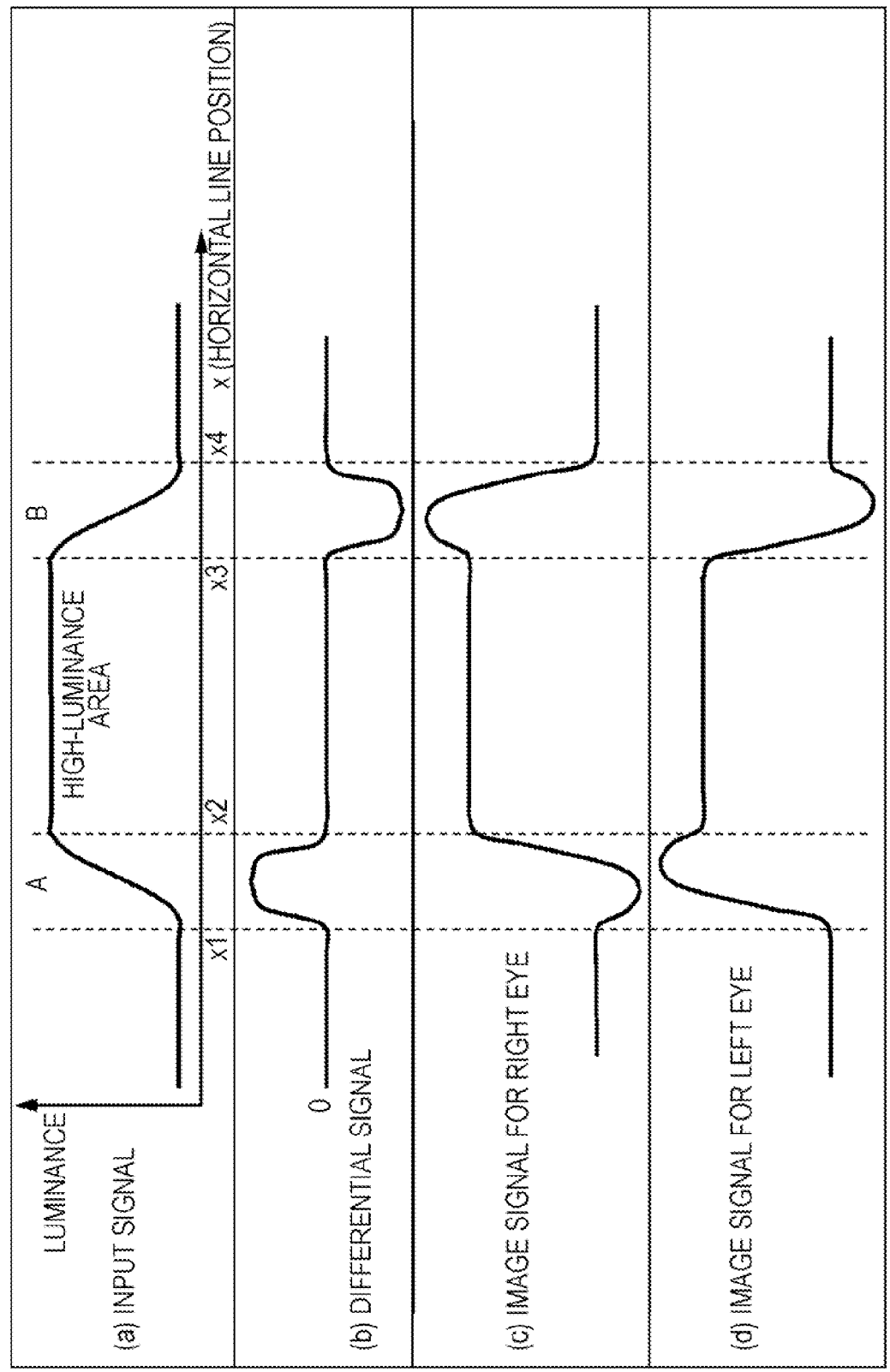
FIG. 7 is a diagram illustrating an example of the image-signal generation processing for a right eye and for a left eye from an input image, which is executed by the image conversion section of an image processing apparatus according to an embodiment of the present invention.

FIG. 7 illustrates a concept of the image combination processing executed by the image combining section 133. FIG. 7 shows the following individual signals in the order from the top.

(a) Input signal
(b) Differential signal
(c) Image signal for a right eye
(d) Image signal for a left eye The input signal (a) shows a change in the luminance of any one horizontal line of any frame of the video data. The input signal shows an example for one line having a high-luminance area in the central part. The luminance gradually increases in an area A from a line position (x1) to a line position (x2). There is the high-luminance area in which a high-level luminance is maintained from the line position (x2) to a line position (x3). After that, the luminance gradually decreases in an area B from the line position (x3) to a line position (x4).

The differential signal (b) is the result of the differentiation of the input signal (a). The differential signal is the signal generated by the differentiator 131 of the image conversion section 130 shown in FIG. 5. As shown in FIG. 7, the differential signal generated by the differentiator 131 has a positive value in the area A in which the luminance change of the input signal (a) becomes positive, and has a negative value in the area B in which the luminance change of the input signal (a) becomes negative.

The image signal (c) for a right eye and the image signal (d) for a left eye are signals generated by the image combining section 133 of the image conversion section 130 shown in FIG. 5. The image combining section 133 combines the input signal (a) and the disparity enhancement signal [enh], which is the result (the output of the non-linear conversion section 132) produced by the non-linear conversion of the differential signal (b) by the non-linear conversion section 132 to generate the image signal (c) for a right eye and the image signal (d) for a left eye.

It is assumed that the luminance level of the video data corresponding to the input signal (a) shown by FIG. 7 is S, and the signal level of the disparity enhancement signal [enh] produced by non-linearly converting the differential signal (b) shown by FIG. 7 is E.

The image combining section 133 receives the video data S corresponding to the input signal (a) and the disparity enhancement signal [enh E] produced by non-linearly converting the differential signal (b), and generates the image signal for a right eye, Right, and the image signal for a left eye, Left, by the following Expression-1, for example.

$Right = S - E$ $Left = S + E$ (Expression-1)

Here, the image combining section 133 may not convert both the image signal for a right eye, Right, and the image signal for a left eye, Left, as shown in (Expression-1) and may convert either one of the image signals.

That is to say, the following combination may be used.

$Right = S - E$ $Left = S$

Alternatively, the following combination may also be used.

$Right = S$ $Left = S + E$

By such processing, it is possible for the image signal for a right eye, Right, and the image signal for a left eye, Left, to produce an image generating a retinal disparity of the user to give the perception of depth. In this regard, a description will be given later of a relationship between a retinal disparity and the perception of depth with reference to FIG. 12 and the subsequent figures.

In this regard, as described above, the conversion processing of the non-linear conversion section 132 may be omitted, the differential signal generated by the differentiator 131 may be directly input into the image combining section 133 (the broken line in FIG. 5), and the image combining section 133 may perform processing generating images for right and left eyes by applying the differential signal. In this case, the above-described disparity enhancement signal [enh E] is replaced by the differential signal.

In this manner, the image combining section 133 extracts a spatial feature quantity of the input image signal, and performs enhancement processing by applying the feature quantity on the input image signal so as to generate images for right and left eyes. The feature quantity is a differential luminance signal of the input image signal or the disparity enhancement signal produced by the non-linear conversion processing of the differential luminance signal.

The image signal for a right eye (c), Right, shown in FIG. 7 is a signal produced by subtracting the disparity enhancement signal [enh E], which is produced by non-linearly converting the differential signal (b), from the input signal (a).

The image signal for a right eye (c), Right, is generated to be a signal having the following characteristics c1 to c3 as shown in FIG. 7.

Signal Characteristics c1: At least in a part of the area A in which the luminance change of the input signal (a) is positive and the differential signal (b) has a positive value, a signal area having a luminance lower than the input signal (a) arises.

c2: At least in a part of the area B in which the luminance change of the input signal (a) is negative and the differential signal (b) has a negative value, a signal area having a luminance higher than the input signal (a) arises.

c3: In an area where the differential signal (b) has a value of 0, there is no change in the luminance with respect to the input signal (a).

On the other hand, the image signal for a left eye (d), Left, shown in FIG. 7 is a signal produced by adding the disparity enhancement signal [enh E], which is produced by non-linearly converting the differential signal (b), to the input signal (a).

The image signal for a left eye (d), Left, is generated to be a signal having the following characteristics d1 to d3 as shown in FIG. 7.

Signal Characteristics d1: At least in a part of the area A in which the luminance change of the input signal (a) is positive and the differential signal (b) has a positive value, a signal area having a luminance higher than the input signal (a) arises.

d2: At least in a part of the area B in which the luminance change of the input signal (a) is negative and the differential signal (b) has a negative value, a signal area having a luminance lower than the input signal (a) arises.

d3: In an area where the differential signal (b) has a value of 0, there is no change in the luminance with respect to the input signal (a).

As described above, the image combining section 133 combines the input signal (a) and the disparity enhancement signal [enh], which is the result (the output of the non-linear conversion section 132) produced by the non-linear conversion of the differential signal (b) by the non-linear conversion section 132 to generate the image signal (c) for a right eye and the image signal (d) for a left eye.

In this regard, for example, if the input signal to be converted is a still image, the image combining section 133 generates the image signal (c) for a right eye and the image signal (d) for a left eye for one-frame image which constitutes the still image by the signal combination processing in accordance with the above-described Expression-1.

Also, if the input signal to be converted is a moving image, the image combining section 133 generates the image signal (c) for a right eye and the image signal (d) for a left eye for each one-frame image included in the moving image by the signal combination processing in accordance with the above-described Expression-1. However, in the case of a moving image, the mode of generating the image signal for a right eye and the image signal for a left eye may be changed in accordance with the control method of the image output section 150 (refer to FIG. 1), which finally executes image display, and the display apparatus. In the following, descriptions will be given of a plurality of examples of processing performed by the image combining section 133 in the case where the input signal to be converted is a moving image (video data) with reference to FIG. 8 and the subsequent figures.

First, a description will be given of an example of the basic processing performed by the image combining section 133 in the case where the input signal to be converted is a moving image (video data) with reference to FIG. 8. The example of the processing shown in FIG. 8 is an example of the processing in which the image combining section 133 generates the image for a right eye, Right, and the image for a left eye, Left, for all the individual frames (frames n, n+1, n+2, n+3, . . . ) of the input video data.

Figure 8:
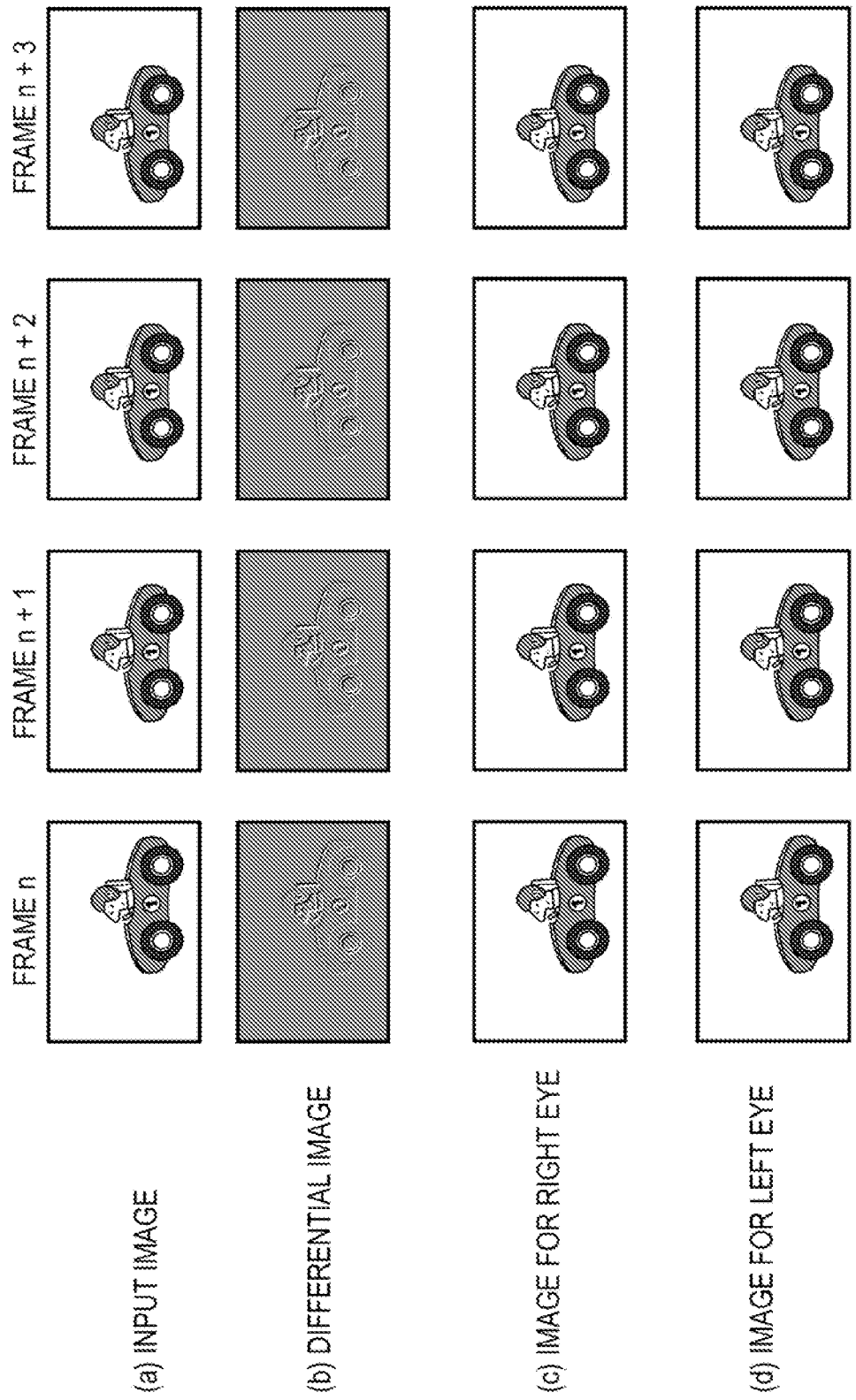
FIG. 8 is a diagram illustrating an example of the image-signal generation processing for a right eye and for a left eye from an input image, which is executed by the image conversion section of an image processing apparatus according to an embodiment of the present invention.

The image combining section 133 combines the luminance signal of the input signal (a) and the disparity enhancement signal [enh], which is the result of the non-linear conversion of the differential signal (b) for all the input frames (a) shown in FIG. 8, and generates and outputs the image signal (c) for a right eye and the image signal (d) for a left eye shown in FIG. 8. In this case, the image combining section 133 outputs video signals of two systems.

The combination processing is performed, for example, by the above-described expression (Expression-1). That is to say, assuming that the luminance level of the video data corresponding to the input signal (a) in FIG. 7 is S, and the signal level of the disparity enhancement signal [enh], which is produced by the non-linear conversion of the differential signal (b) in FIG. 7 is E, the image for a right eye, Right, and the image for a left eye, Left, are generated by the following expression.

The image signal for a right eye: Right=$S-E$

The image signal for a left eye: Left=$S+E$

In the example of the basic processing shown in FIG. 8, the image combining section 133 outputs two-system video signals of images for right and left eyes for all the frames. The image output section 150 (refer to FIG. 1) having received the two-system video signals outputs the data to a display apparatus achieving stereovision. The display apparatus performs output control in accordance with various display methods achieving stereovision. The display methods of a display apparatus include, for example, an image output method supporting a passive-glass method, which separates an image into images observed by right and left eyes, respectively, by a polarization filter or a color filter, or an image output method supporting an active-glass method, which separates an image into images observed by right and left eyes alternately in time by opening and closing right and left liquid crystal shutters alternately, and the like. The display apparatus displays images in accordance with either of the above-described display methods using the two-system video signals generated by the image combining section 133.

1.2 Examples of the Configuration and Output of the Images, for Right and Left Eyes, Generated by an Image Processing Apparatus According to the Present Invention When an image display method is determined in advance, the image combining section 133 can generate and output an output image signal in accordance with each image output method. In the following, descriptions will be given of examples of processing by the image combining section 133 in accordance with three different display methods with reference to FIGS. 9 to 11.

The display methods of the display apparatuses for finally displaying images include three kinds of display methods as follows.

Figure 9:
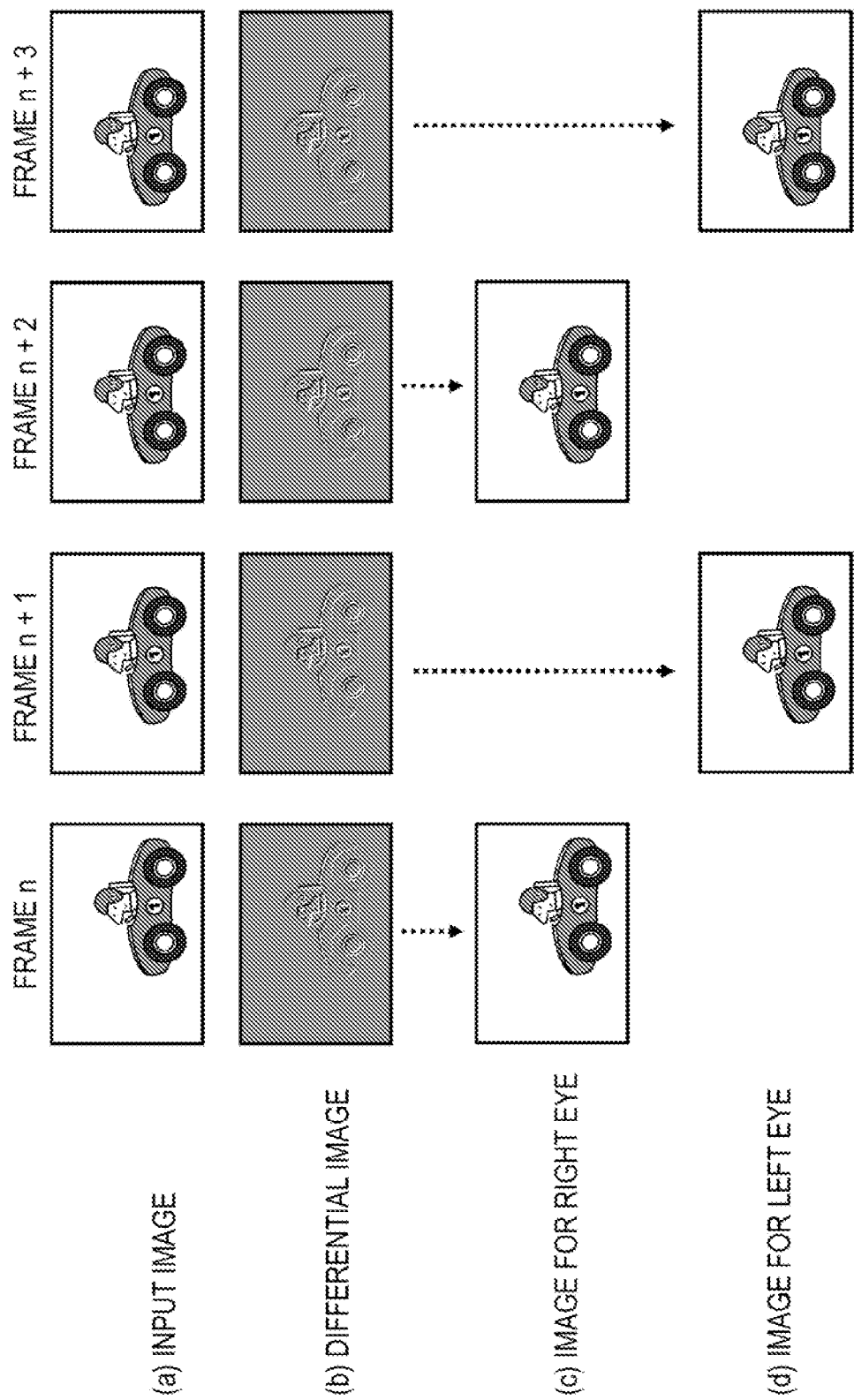
FIG. 9 is a diagram illustrating an example of the image-signal generation processing for a right eye and for a left eye from an input image, which is executed by the image conversion section of an image processing apparatus according to an embodiment of the present invention.

(1) Method of outputting images for right and left eyes alternately by time division (FIG. 9)

This is, for example, an image output method supporting an active-glass method, which separates an image into images observed by right and left eyes alternately in time by opening and closing right and left liquid crystal shutters alternately.

Figure 10:
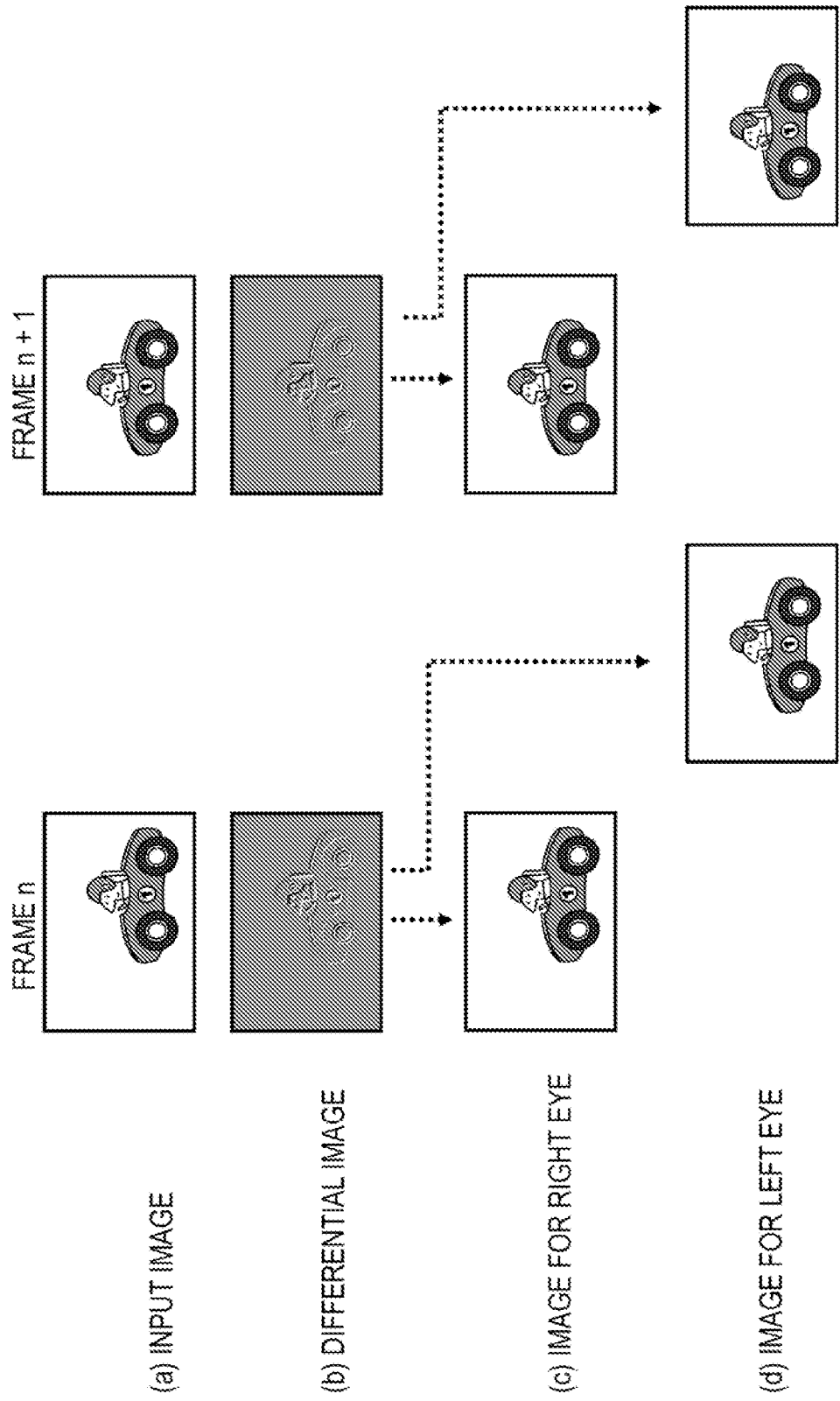
FIG. 10 is a diagram illustrating an example of the image-signal generation processing for a right eye and for a left eye from an input image, which is executed by the image conversion section of an image processing apparatus according to an embodiment of the present invention.

(2) Method of having a high-speed output frame rate in the method of outputting images for right and left eyes alternately by time division (FIG. 10)

This is the same time-division method as that of FIG. 9, but has a high-speed output frame rate.

Figure 11:
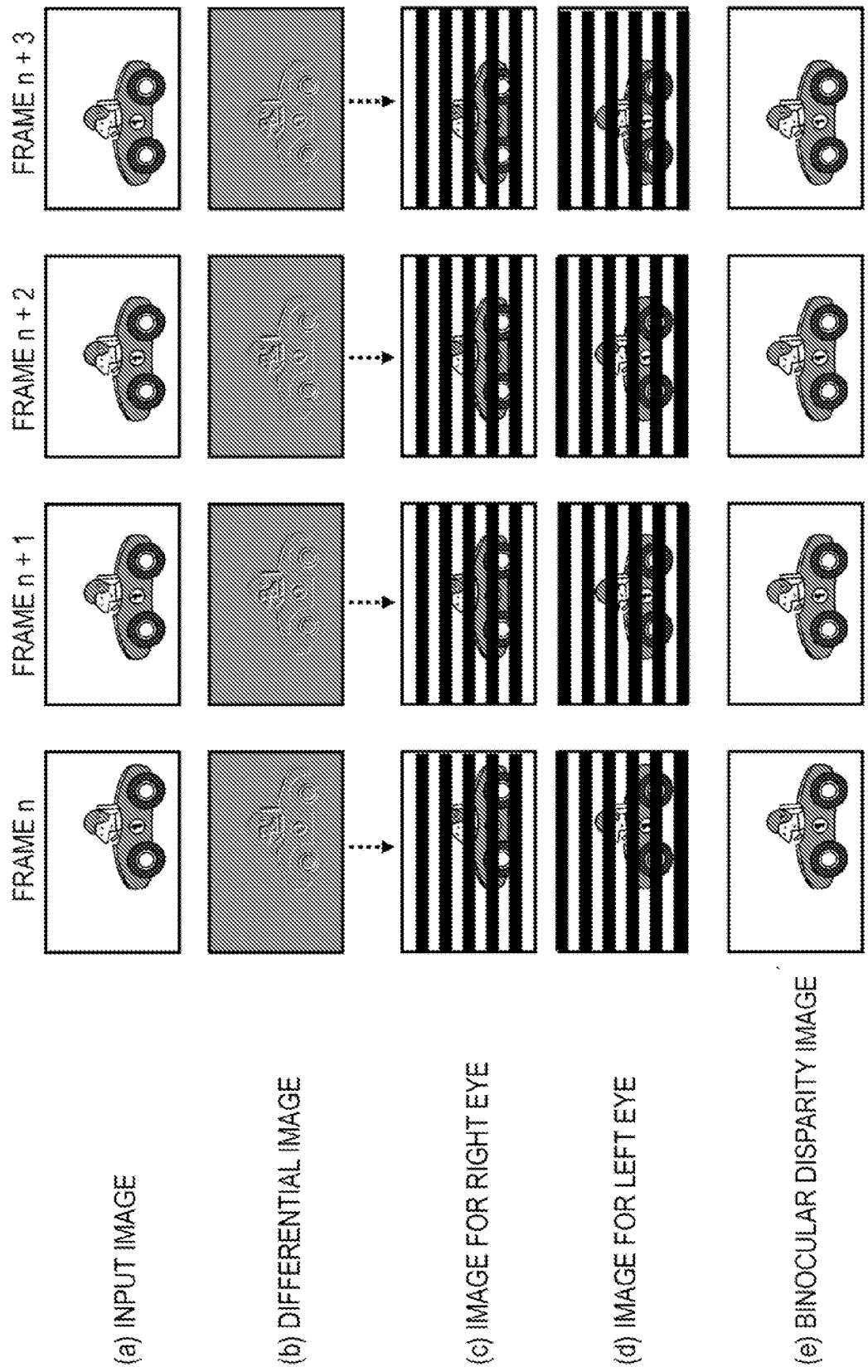
FIG. 11 is a diagram illustrating an example of the image-signal generation processing for a right eye and for a left eye from an input image, which is executed by the image conversion section of an image processing apparatus according to an embodiment of the present invention.

(3) Method of spatially separating images for right and left eyes and outputting the images at the same time (FIG. 11)

This is, for example, an image output method supporting a passive-glasses method, which separates an image into images observed by right and left eyes, respectively, by a polarization filter or a color filter. For example, in a stereoscopic display apparatus of the space-division method, a polarizing filter, whose polarization direction is set different for each horizontal line, is attached on a front surface of the display, so that when the user views the image through glasses of a polarizing filter method, the user observes the video separately for right and left eyes for each horizontal line.

First, with reference to FIG. 9, a description will be given of an example of the processing of the image combining section 133 in the case where the display method of the display apparatus finally displaying images is the method of outputting the images for right and left eyes alternately in time.

In the case of the method of displaying images, the image combining section 133 generates and outputs the image for a right eye, Right, and the image for a left eye, Left, alternately for each frame for each frame (frames n, n+1, n+2, n+3, . . . ) of the input video data.

The image combining section 133 sets an odd-numbered frame and an even numbered frame of the input video data as an image for a left eye, and an image for a right eye (or an image for a right eye, and an image for a left eye), respectively, and outputs the frames of the video data. The output images are output as the image for a left eye, and the image for a right eye alternately by time-division through the image output section 150 in the image display apparatus. The output timing of each image is controlled so as to be synchronized with, for example, the opening and closing of the shutter of the glasses, which are of a liquid-crystal shutter method, worn by a user observing the image. That is to say, the control is performed such that the image for a left eye, and the image for a right eye are respectively observed by a left eye and a right eye alternately in time.

In order to output the images to such a time-division stereoscopic display apparatus, the image combining section 133 performs image combination processing alternately for the images for right and left eyes for each frame (frames n, n+1, n+2, n+3, . . . ) of the input video data. That is to say, as shown by (c) and (d) in FIG. 9, the combination of the image for a right eye, Right, and the combination of the image for a left eye, Left, are carried out alternately for each frame, and the images are output.

In the example shown in FIG. 9, an image for a right eye is generated, in accordance with the expression (Expression-1) described before, for frame n. That is to say, assuming that the luminance level of the video data of frame n of the input signal (a) in FIG. 9 is S, and the signal level of the disparity enhancement signal [enh], which is produced by the non-linear conversion of the differential signal (b) of frame n shown in FIG. 9, is E, the image for a right eye, Right, is generated by the following expression.

The image signal for a right eye: Right=$S-E$

An image for a left eye is generated, in accordance with the expression (Expression-1) described before, for the next frame n+1. That is to say, assuming that the luminance level of the video data of frame n+1 of the input signal (a) in FIG. 9 is S, and the signal level of the disparity enhancement signal [enh], which is produced by the non-linear conversion of the differential signal (b) of frame n+1 shown in FIG. 9 is E, the image for a left eye, Left, is generated by the following expression.

The image signal for a left eye: Left=$S+E$

After that, the image for a right eye is generated for frame n+2, and the image for a left eye is generated for frame n+3, and subsequently, the images for right and left eyes are generated by the image combination processing in accordance with the above-described Expression-1, and are output. In this method, the image combining section 133 generates one image for a right eye or for a left eye, corresponding to each frame, and outputs the image. That is to say, the image combining section 133 outputs one-system video data.

The output images are output as the image for a left eye, and the image for a right eye alternately by time-division through the image output section 150 in the image display apparatus. The output timing of each image is controlled so as to be synchronized with, for example, the opening and the closing of the shutter of the glasses, which is of a liquid-crystal shutter method, worn by a user observing the image. That is to say, the control is performed such that the image for a left eye, and the image for a right eye are respectively observed by a left eye and a right eye alternately in time.

In the same manner as FIG. 9, FIG. 10 illustrates an example of the processing of the image combining section 133 in the case where the display method of the display apparatus finally displaying images is the method of outputting the images for right and left eyes alternately in time. However, different from the processing shown in FIG. 9, in this example of processing, both images for a left eye, Left, and for a right eye, Right, are combined by the combination processing in accordance with the above-described Expression-1 for each frame of the input video data to be output.

The display apparatus outputting images outputs the images for right and left eyes alternately in time at a frame rate two times that of the input video data.

In this processing, as shown in FIG. 10, the image combining section 133 generates the image signal (c) for a right eye and the image signal (d) for a left eye from one frame, for example, frame n of the input signal (a) and the disparity enhancement signal produced from and the differential image (b) thereof by applying the above-described Expression-1. Further, the image combining section 133 generates the image (c) for a right eye and the image (d) for a left eye from frame n+1 of the input image (a) and the disparity enhancement signal produced from and the differential image (b) thereof by applying the above-described Expression-1.

In this manner, the images for right and left eyes are generated from one frame. The two images generated from one frame, that is to say, the image signal for a right eye and the image signal for a left eye are alternately output at the image display apparatus by time division through the image output section 150.

The image output section 150 outputs the images such that the display apparatus displays the image at a frame rate two times that of the frame rate of the input image shown by (a) in FIG. 10. In this regard, the control is performed so that the opening and the closing of the shutter of the glasses, for example, by a liquid-crystal shutter method, worn by a user observing the image is in synchronism with the display timing. That is to say, the control is performed such that the image for a left eye, and the image for a right eye are respectively observed by a left eye and a right eye alternately in time. In this method, the image combining section 133 outputs video data having a frame rate two times that of one-system input video data.

FIG. 11 illustrates an example of the processing of the image combining section 133 in the case of outputting images to a stereoscopic display apparatus of the space-division method. In a stereoscopic display apparatus of the space-division method, a polarizing filter, whose polarization direction is set different for each horizontal line, is attached on a front surface of the display, so that when the user views the image through glasses of a polarizing filter method, the user sees the video separately for right and left eyes for each horizontal line. That is to say, the right and left polarizing filters of the glasses are also filters having different polarization directions with each other, and thus the user observes only the image for a right eye shown by (c) in FIG. 11 by the right eye, and observes only the image for a left eye shown by (d) in FIG. 11 by the left eye.

In this processing, as shown in FIG. 11, the image combining section 133 generates the image signal (c) for a right eye and the image signal (d) for a left eye from one frame, for example, frame n of the input signal (a) and the disparity enhancement signal produced from and the differential image (b) thereof by applying the above-described Expression-1.

Further, the image combining section 133 generates the binocular disparity image (e) shown in FIG. 11 from the image (c) for a right eye and the image (d) for a left eye. That is to say, the image combining section 133 shifts the phase of each image of the image (c) for a right eye and the image (d)

for a left eye individually by one line so as to perform contraction processing by ½ in the vertical direction. The image combining section 133 combines the images for right and left eyes obtained in this manner alternately for each horizontal line to generate one binocular disparity image (e), and outputs the image.

The binocular disparity image (e) shown in FIG. 11 is an image generated by connecting valid areas (image display sections other than black lines) of the image (c) for a right eye and the image (d) for a left eye. That is to say, the binocular disparity image (e) is an image including alternately each line data of the image (c) for a right eye and the image (d) for a left eye. In this manner, the image combining section 133 generates the binocular disparity image (e), and outputs the image. In this method, the image combining section 133 outputs one-system video data having the same frame rate as that of the input image.

The image output section 150 output-displays the binocular disparity image (e) shown in FIG. 11 to a space-division stereoscopic display apparatus. As described above, the space-division stereoscopic display apparatus is provided with a polarizing filter, whose polarization direction is set different for each horizontal line, on a front surface of the display apparatus. The user observes the image with glasses of a polarizing filter method. The right and left polarizing filters are also filters whose polarization directions are set differently. The user observes only the image for a right eye shown by (c) in FIG. 11 by the right eye, and observes only the image for a left eye shown by (d) in FIG. 11 by the left eye.

The image for a right eye, Right, and the image for a left eye, Left, described with reference to FIGS. 8 to 11, are the images generated by the above-described expression (Expression-1). That is to say, the image for a right eye, Right, and the image for a left eye, Left, are images generated by following expression:

Right=$S-E$

Left=$S+E$ where S is the input signal, E is the disparity enhancement signal produced by non-linearly converting the differential signal D of the input signal S. In this regard, as described above, the disparity enhancement signal E is produced not only by the non-linear conversion of the differential signal D of the input signal S, but also may be produced by linear conversion of the signal.

1.3 about Retinal Disparity of the Images, for Right and Left Eyes, Generated by an Image Processing Apparatus According to the Present Invention In this manner, the image for a right eye, Right, and the image for a left eye, Left, are generated, and it is possible for the user to perceive depth by observing these images by the right eye and the left eye, respectively. This is a phenomenon based on the retinal disparity between the image for a right eye and the image for a left eye. In the following, a description will be given of the retinal disparity between the images for right and left eyes generated by the image processing apparatus 100 according to the present invention with reference to FIGS. 12 to 15. In this regard, in the following, in FIGS. 12 to 14, a description will be given on the assumption that the non-linear conversion processing on the differential signal D is omitted, and the image for a right eye, Right, and the image for a left eye, Left, are generated by the following expression using the input signal S and the differential signal D of the input signal S.

Right=$S-D$

Left=$S+D$

Figure 12:
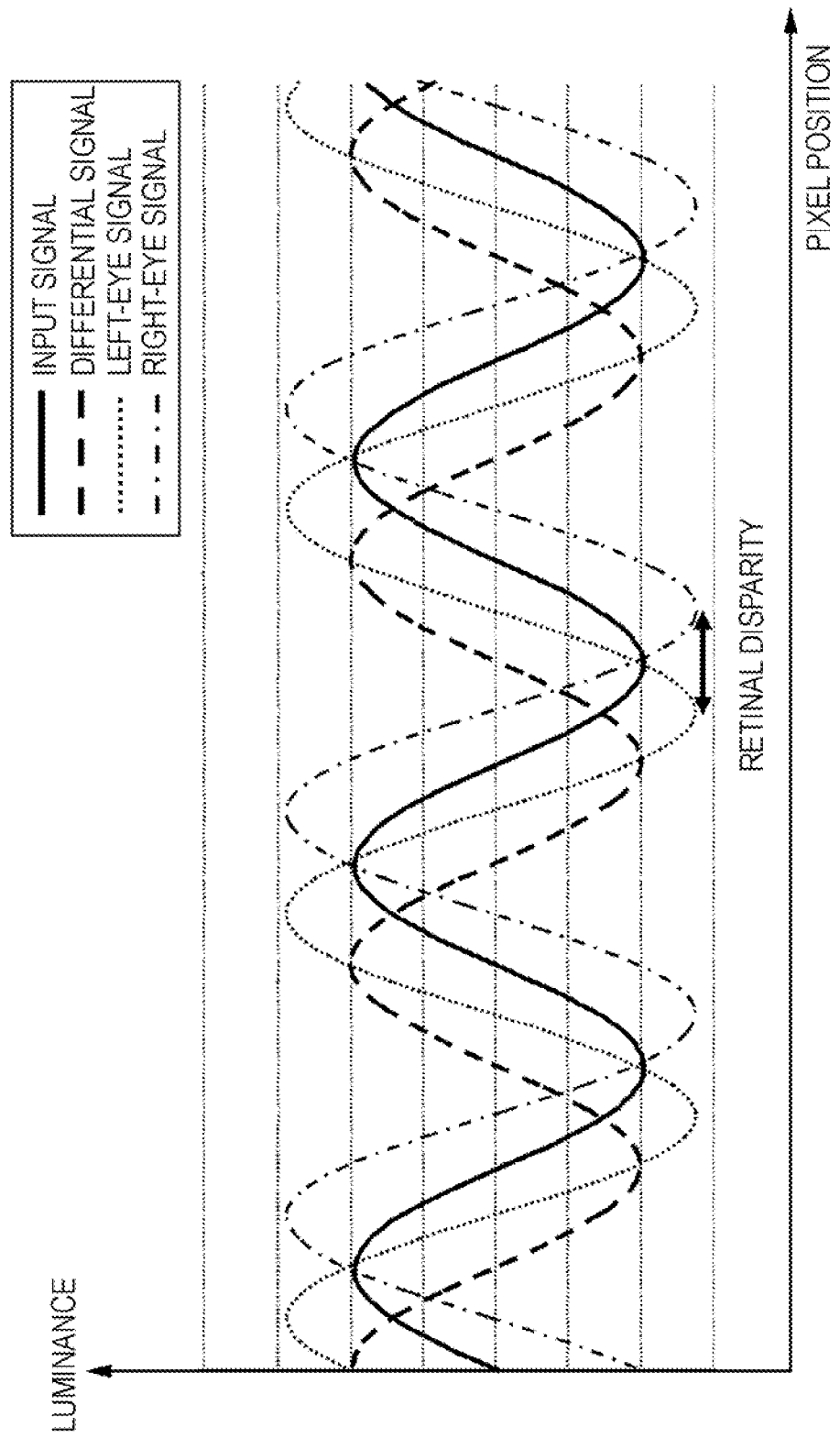
FIG. 12 is a diagram illustrating a retinal disparity between a right-eye image and a left-eye image, generated by an image processing apparatus according to an embodiment of the present invention.

FIG. 12 is a diagram illustrating retinal disparity arising by the addition and subtraction of a differential signal. Here, for the sake of simplicity, the illustration is given how the signal for a right eye and the signal for a left eye are generated when a one-dimensional sinusoidal wave signal is input as the input signal. The horizontal axis in the figure shows a pixel position of the image in the horizontal direction and the vertical axis shows the luminance level of the pixel.

The input signal S is expressed by the following Expression-2.

$S = \sin \omega x$ (Expression-2)

At this time, the differential signal D is expressed by the following Expression-3.

$D = \cos \omega x$ (Expression-3)

At this time, the left-eye signal L and the right-eye signal R are expressed by the following Expression-4 and Expression-5.

$$L = S + D = \sin\omega x + \cos\omega x = \sqrt{2}\sin\left(\omega x + \frac{\pi}{4}\right)$$ (Expression-4)

$$R = S - D = \sin\omega x - \cos\omega x = \sqrt{2}\sin\left(\omega x + \frac{\pi}{4}\right)$$ (Expression-5)

From the expressions, Expression-4 and Expression-5, it is understood that the left-eye signal L advances π/4 in phase with respect to the input signal S, and the right-eye signal R delays π/4 in phase with respect to the input signal S. That is to say, the left-eye signal L is a signal having an amplitude √2 times that of the input signal, and shifted by ⅛ the cycle determined by an angular frequency ω leftward in the horizontal direction. In the same manner, the right-eye signal R is a signal having an amplitude √2 times that of the input signal, and shifted by ⅛ the cycle determined by an angular frequency ω rightward in the horizontal direction. In this manner, the phase difference of π/2 occurs between the left-eye signal L and the right-eye signal R. This phase difference is perceived as a retinal disparity so as to allow the user to have a sense of depth.

Figure 13:
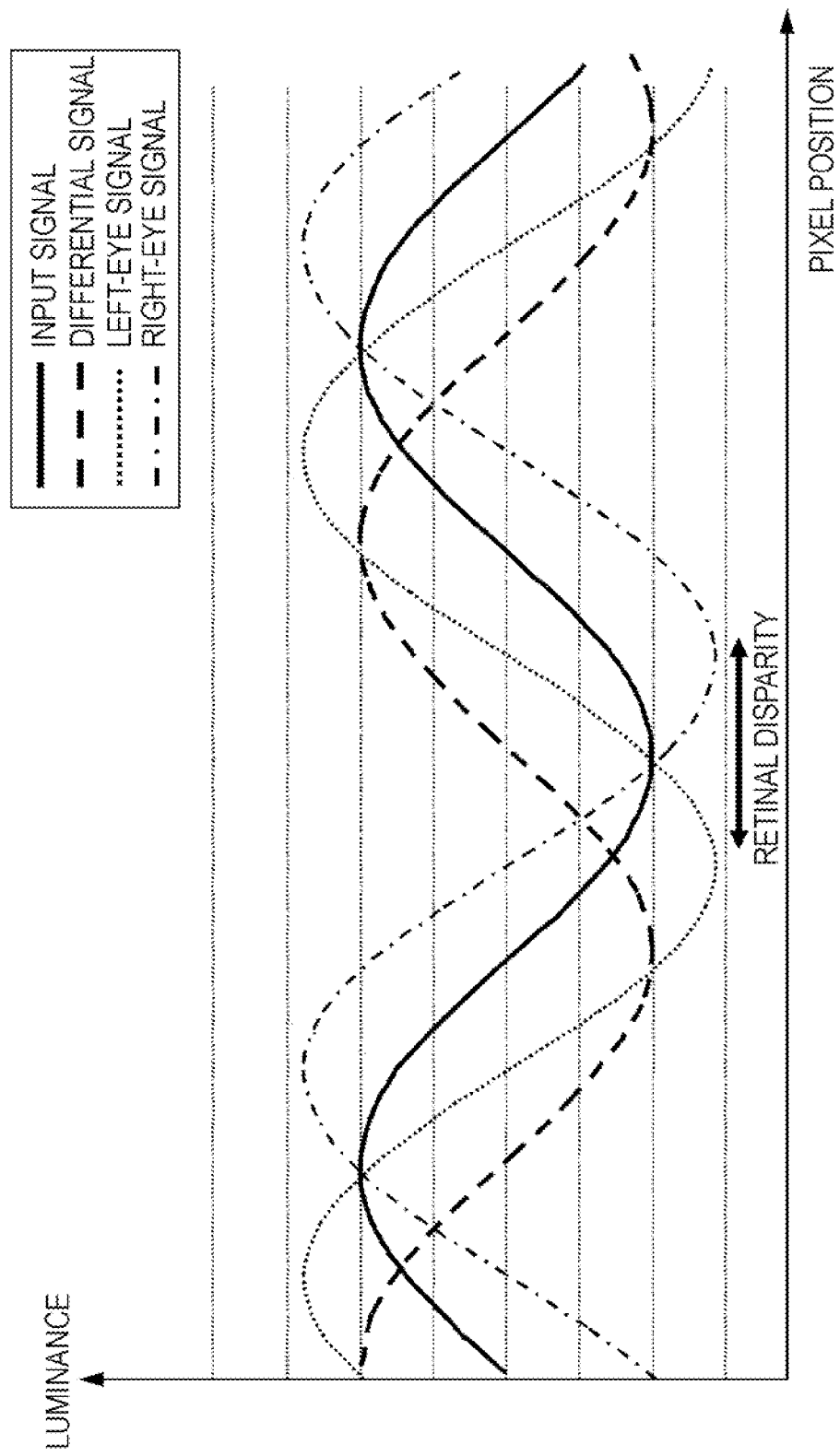
FIG. 13 is a diagram illustrating a retinal disparity, between a right-eye image and a left-eye image, generated by an image processing apparatus according to an embodiment of the present invention.

As described above, the retinal disparity changes depending on the angular frequency ω. FIG. 13 shows a waveform in the case where the angular frequency of the input signal becomes ½ that in FIG. 12. As is understood from the figures, the retinal disparity becomes two times that of the case in FIG. 12. Thus, if a binocular stereoscopic image is obtained, the image is perceived to have a greater depth than the input signal in FIG. 12.

Figure 14:
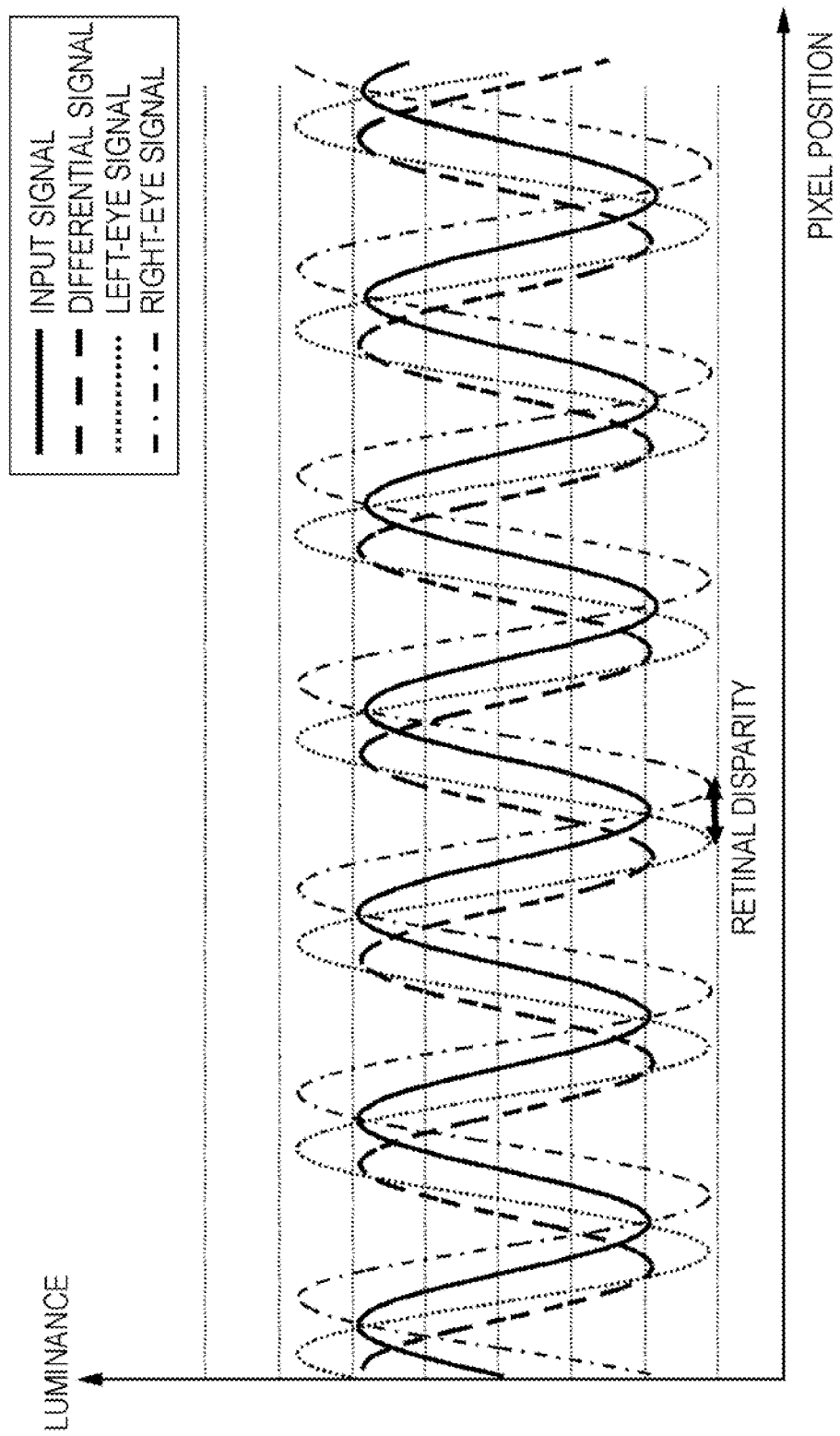
FIG. 14 is a diagram illustrating a retinal disparity between a right-eye image and a left-eye image, generated by an image processing apparatus according to an embodiment of the present invention.

Also, FIG. 14 shows a waveform in the case where the angular frequency of the input signal becomes two times that in FIG. 12. As is understood from the figures, the retinal disparity becomes ½ that of the case in FIG. 12. Thus, if a binocular stereoscopic image is obtained, the image is perceived to be nearer than the input signal in FIG. 12.

Figure 15:
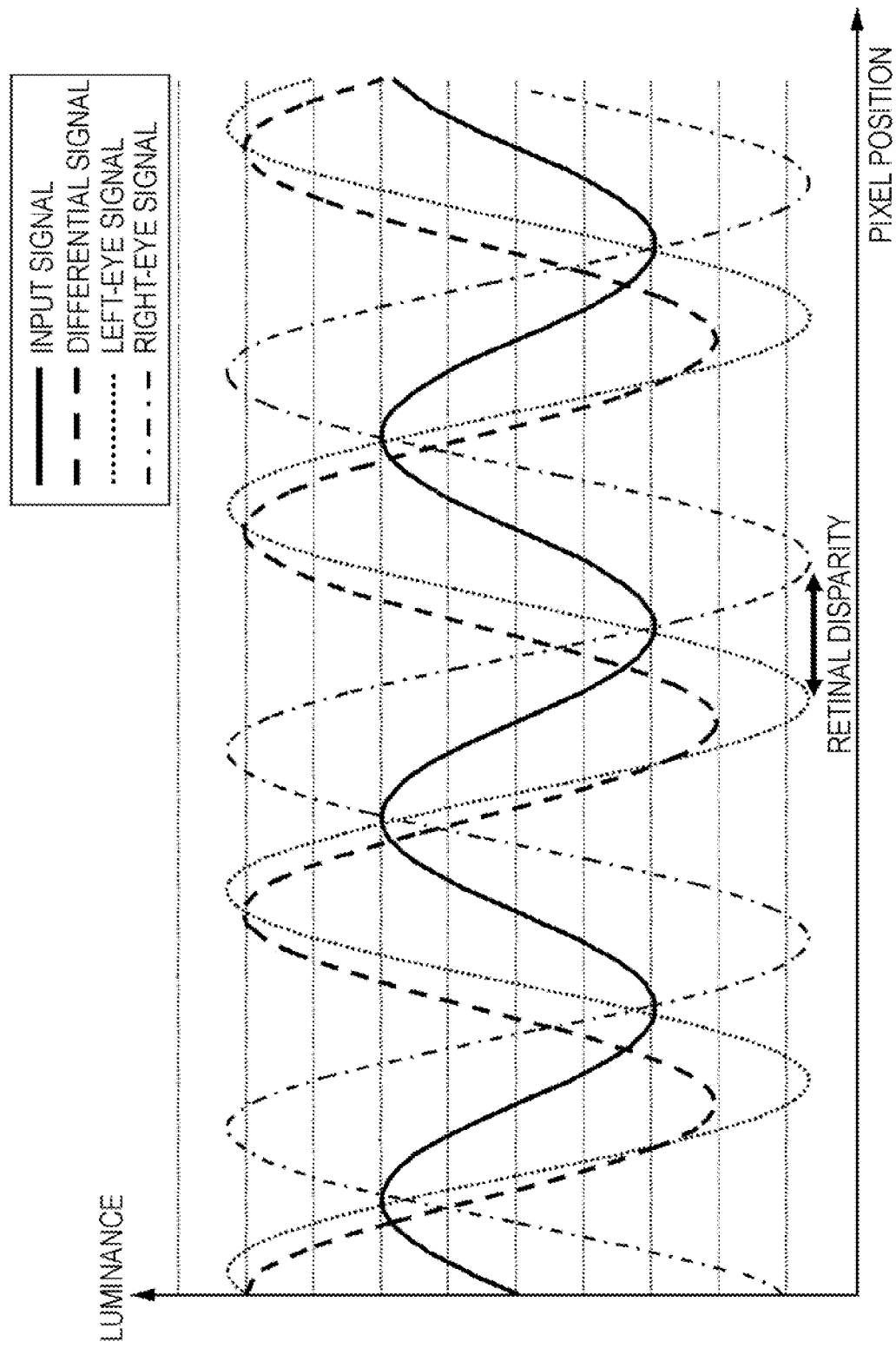
FIG. 15 is a diagram illustrating a binocular disparity, between a right-eye image and a left-eye image, generated by an image processing apparatus according to an embodiment of the present invention.

Further, FIG. 15 shows a waveform in the case where the amplitude of the differential signal D is controlled. FIG. 15 shows the case where two times amplification is applied to the differential signal D. In order to generalize more, the controlled differential signal F is expressed by Expression-6.

$F = k \cos \omega x$ (Expression-6)

where k is a positive real number.

In this regard, the above-described F corresponds to the above-described disparity enhancement signal E produced by the conversion processing on the differential signal D.

At this time, the left-eye signal L and the right-eye signal R are expressed by the following Expression-7 and Expression-8.

$$L = S + F = \sin\omega x + k\cos\omega x = \sqrt{1+k^2}\sin(\omega x + \alpha) \quad \text{(Expression-7)}$$

$$R = S - F = \sin\omega x - k\cos\omega x = \sqrt{1+k^2}\sin(\omega x - \alpha) \quad \text{(Expression-8)}$$

Here, α is in the range of 0 to π/2, and is expressed by the following Expression-9.

$$\alpha = \arccos\frac{1}{\sqrt{1+k^2}} \quad \text{(Expression-9)}$$

In the above-described expression, Expression-9, when the amplification value k of the differential signal is increased, α becomes large, and thus the differences between the input signal S and the left-eye signal L, and between the input signal S and the right-eye signal R become large. Accordingly, the phase difference between the left-eye signal L and the right-eye signal becomes large, and thus the retinal disparity is perceived to be large. As a result, when a binocular stereoscopic vision is obtained, greater depth is perceived.

In this manner, the images for right and left eyes generated by an image processing apparatus 100 according to the present invention change in the retinal disparity in accordance with the spatial frequency of the image. The higher the spatial frequency of an area, the smaller the retinal disparity becomes, and the lower the spatial frequency of an area, the larger the retinal disparity becomes. When such an image is presented to human right and left eyes, separately and respectively, the human being perceives an area having a small retinal disparity to be at the front, and an area having a large retinal disparity to be at the back.

However, as described above, an image processing apparatus 100 according to the present invention simply performs processing in accordance with a local spatial frequency, and thus a different retinal disparity is given to an edge part and a texture part of an individual subject in the image. Accordingly, it is difficult for the observer to correctly perceive depth only from the retinal disparity, and thus it is thought that a human being can perceive comprehensive depth of an image by estimating the image information using pictorial feature (composition, a front and behind relationship, a spatial frequency) of an image, and a motion parallax, etc., as a clue.

Also, as described above, the retinal disparity is caused to arise mainly on an edge part of an image, and thus it is possible to give the retinal disparity on a minute structure, such as a branch of a tree, an electric wire, a hair, etc. Accordingly, it is possible to give stereoscopic effect on a minute subject.

An image processing apparatus according to the present invention achieves binocular disparity image allowing a natural stereoscopic vision by only applying local modulation processing on an image using such a characteristic.

Further, an image processing apparatus according to the present invention generates the image for a right eye, Right, and the image for a left eye, Left, in accordance with the above-described expression (Expression-1). That is to say, assuming that the luminance level of the video data corresponding to the input signal is S, and the signal level of the disparity enhancement signal [enh], which is produced by the non-linear conversion of the differential signal (b) in FIG. 7 is E, the image for a right eye, Right, and the image for a left eye, Left, are generated by the following expression.

The image signal for a right eye: Right=$S-E$

The image signal for a left eye: Left=$S+E$

As is understood from this expression, the sum signal produced by adding the image signal for a right eye and the image signal for a left eye becomes as follows.

The sum signal=$(S+E)+(S-E)=S$

As a result, the sum signal becomes equivalent to the input image.

Accordingly, for example, as described with reference to FIGS. 9 and 10, when an image is displayed by a time-division stereoscopic display apparatus, if a user, who is an observer, observes the image without wearing glasses of a liquid-crystal shutter method, the user perceives the image produced by integrating the image for a right eye, Right, and the image for a left eye, Left, by the integration function in time of a human visual system. This image becomes the above-described sum signal S, that is to say, The sum signal=$(S+E)+(S-E)=S$ That is to say, the user can perceive the input two-dimensional image without change. That is to say, the user does not see unnatural overlapped images, and can observe the image without having been subjected to any processing.

Also, as shown in FIG. 11, when an image is displayed by a stereoscopic display apparatus of a space-division method, if a user observes the image from a distance such that one pixel in the vertical direction becomes difficult to be perceived without polarizing glasses, the user perceives the sum image of two pixels in the vertical direction. This image becomes the above-described sum signal S, that is to say, The sum signal=$(S+E)+(S-E)=S$ On the other hand, the visual power of a human being on the retinal disparity is 10 times higher than a normal visual power, and thus it is possible to sufficiently recognize the retinal disparity between the images for right and left eyes by observing from such a distance. Accordingly, the user does not see unnatural overlapped images when not wearing polarizing glasses, and can observe the image without having been subjected to any processing. It becomes possible for the user to perceive stereovision in the case of wearing polarizing glasses.

In this manner, the image generated by an image processing apparatus according to the present invention allows the user using a stereoscopic display apparatus to perceive the image stereoscopically when wearing glasses for stereovision, and to perceive the image as the original two-dimensional image without having been subjected to conversion when not wearing glasses for stereovision.

Figure 16:
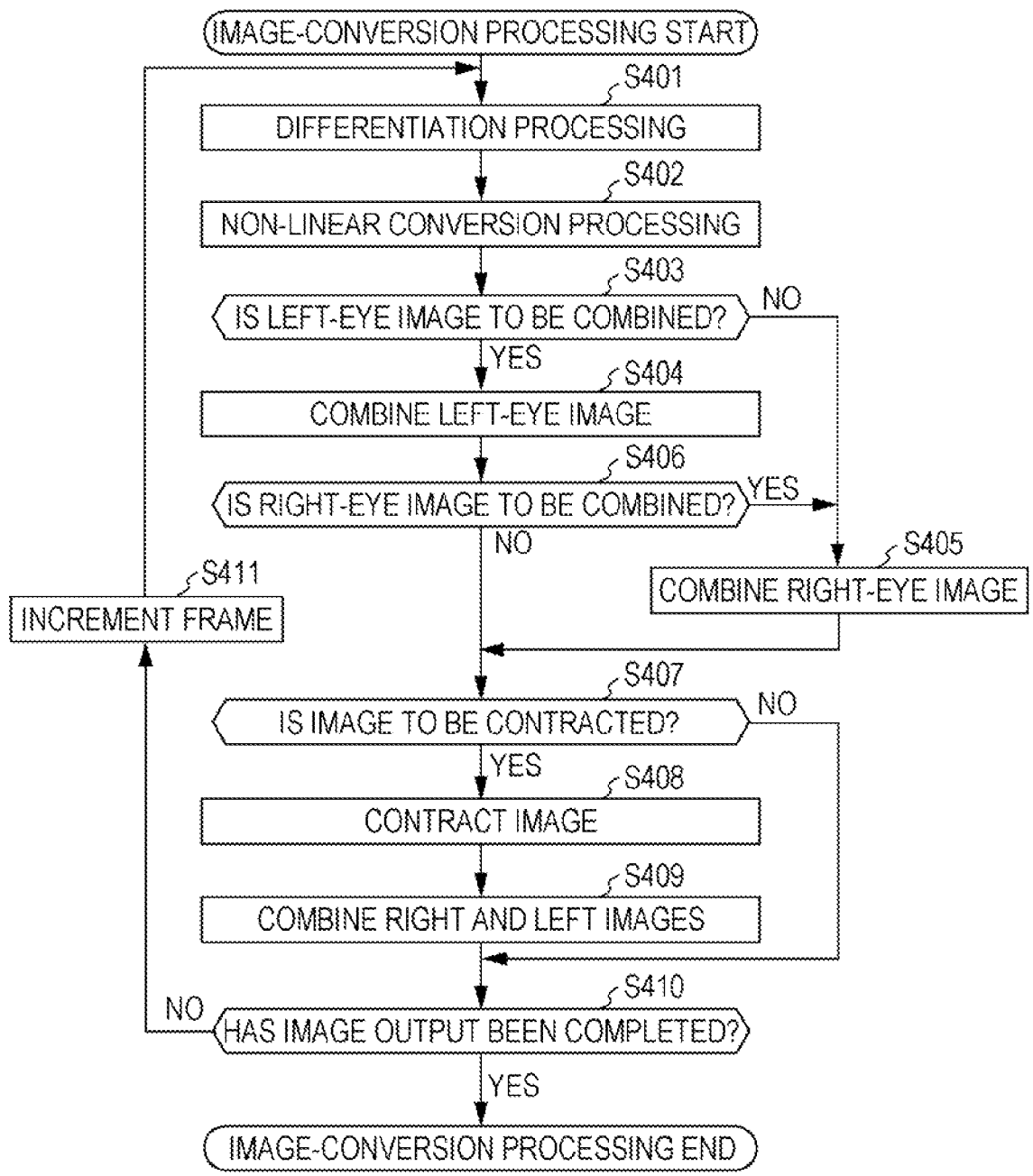
FIG. 16 is a flowchart illustrating a processing sequence executed by the image conversion section of an image processing apparatus according to an embodiment of the present invention.

1.4 about Processing Sequence of the Image Conversion Section of an Image Processing Apparatus According to the Present Invention Next, a description will be given of a processing sequence executed by the image conversion section 130 of the image processing apparatus 100 according to an embodiment of the present invention with reference to a flowchart shown in FIG. 16. In this regard, the flowchart shown in FIG. 16 is the processing in the case where the input image is a moving image (video data).

In step S401, the differentiator 131 (refer to FIG. 5) performs differentiation processing on the luminance signal of the video data input into the image conversion section 130. That is to say, the differentiator 131 performs differentiation processing on the input signal (a) in FIG. 7 to generate the differential signal (b) in FIG. 7.

In step S402, the non-linear conversion section 132 (refer to FIG. 5) non-linearly converts the differential signal output from the differentiator 131. The non-linear conversion processing is, for example, corresponding to a graph as shown in FIG. 6, for example.

The processing in step S403 and the subsequent processing are the processing performed by the image combining section 133. In step S403, the control section in the image combining section 133 determines whether to combine an image for a left eye on the current input frame. The determination processing is performed in accordance with the display method of the image display apparatus output by the image processing apparatus 100 and the frame counter value provided in the image combining section 133. The frame counter is a counter holding a value corresponding to the frame number of the input image frame.

In the case where the output method of the image display apparatus is a time-division output method shown in FIG. 9, the image combining section 133 determine whether to output the image for a left eye in accordance with the value of the frame counter. That is to say, in the case of the time-division output method shown in FIG. 9, the control is performed so as to output the image for a left eye only either for an even-numbered frame or an odd-numbered frame. If determined to output the image for a left eye in accordance with the value of the frame counter, the processing proceeds to step S404. On the other hand, if it is determined the frame to output the image for a right eye from the value of the frame counter, the processing proceeds to step S405.

Also, except for the case of a time-division method shown in FIG. 9, that is to say, in the case of a time-division output method based on two times the frame rate, shown in FIG. 10, or a space-division output method, shown in FIG. 11, or in the case where the image display apparatus inputs the images for right and left eyes, shown in FIG. 8, to perform display control, the image combining section 133 determines to combine the image for a left eye for all the input frames, and the processing proceeds to step S404.

In step S404, the image combining section 133 generates the image for a left eye, Left, in accordance with the above-described expression, Expression-1. That is to say, as shown in FIG. 7, assuming that the luminance level of the video data corresponding to the input signal (a) shown in FIG. 7 is S, and the signal level of the disparity enhancement signal [enh] produced by non-linearly converting the differential signal (b) shown in FIG. 7 is E, the image combining section 133 generates the image signal for a left eye, Left, by the following expression.

The image signal for a left eye: Left=$S+E$

On the other hand, in step S403, if determined that the combination of the image for a left eye is not carried out for the current input frame, the processing proceeds to step S405, and the image combining section 133 generates the image for a right eye for the current input frame. That is to say, as shown in FIG. 7, assuming that the luminance level of the video data corresponding to the input signal (a) shown in FIG. 7 is S, and the signal level of the disparity enhancement signal [enh] produced by non-linearly converting the differential signal (b) shown in FIG. 7 is E, the image combining section 133 generates the image signal for a right eye, Right, by the following expression.

The image signal for a right eye: Right=$S-E$

In step S404, when the generation of the image for a left eye is completed, in step S406, a determination is made of whether the image for a right eye is also generated for the same frame for which the image for a left eye has been generated. In the case where the output method of the image processing apparatus is a time-division method shown in FIG. 9, either the image for a right eye or the image for a left eye is combined for each frame, and thus a determination is made that the generation of the image for a right eye is not carried out, and the processing proceeds to step S407.

Also, except for the case of a time-division method shown in FIG. 9, that is to say, in the case of a time-division output method based on two times the frame rate, shown in FIG. 10, or a space-division output method, shown in FIG. 11, or in the case where the image display apparatus inputs the images for right and left eyes, shown in FIG. 8, in order to perform display control, the image combining section 133 determines to combine the image for a right eye for all the input frames, and the processing proceeds to step S405. As described above, the processing of step S405 is the generation processing of the image for a right eye in accordance with the above-described expression (Expression-1).

In step S407, the control section of the image combining section 133 determines whether to perform contraction processing of an image. If the output method of the image processing apparatus is a space-division output method shown in FIG. 11, the contraction processing is determined to be performed, and the processing proceeds to step S408. If the output method of the image processing apparatus is other than the space-division output method shown in FIG. 11, that is to say, if any one of the simultaneous output method of the images for right and left eyes, shown in FIG. 8, the time-division method shown in FIG. 9, and the time-division output method based on two times the frame rate, shown in FIG. 10, the image contraction processing is not necessary, and thus the processing proceeds to step S410.

In steps S408 to S409, as described with reference to FIG. 11, the image combining section 133 generates the binocular disparity image (e), shown in FIG. 11, from the image (c) for a right eye and the image (d) for a left eye. That is to say, the image combining section 133 shifts the phase of each image of the image (c) for a right eye and the image (d) for a left eye individually by one line so as to perform contraction processing by ½ in the vertical direction (S408). Further, the image combining section 133 alternately combines the images for right and left eyes obtained in this manner for each horizontal line to generate one binocular disparity image (e) (S409).

In step S410, a determination is made on whether the image output processing has been completed in the image output section 150. If the image output processing has been completed, the image conversion processing is terminated. If the image output processing has not been completed, the processing proceeds to step S411.

In step S411, the frame count is incremented, and the processing proceeds to step S401. After that, the processing from step S401 to step S410 is repeated.

As described above, by an image processing apparatus according to an embodiment of the present invention, two-dimensional image data is input, the feature quantity of the image, that is to say, an edge part having a change in luminance is extracted, and the image mode of the edge part is changed so that pseudo images for right and left eyes are generated. With this arrangement, it becomes possible to generate a preferable binocular disparity image in a stereoscopic display apparatus.

Further, in an image processing apparatus according to the present invention, as shown in FIG. 7, assuming that the luminance level of the video data corresponding to the input signal (a) in FIG. 7 is S, and the signal level of the disparity enhancement signal [enh], which is produced by the non-linear conversion of the differential signal (b) in FIG. 7 is E, the image for a right eye, Right, and the image for a left eye, Left, are generated by the following expression.

The image signal for a right eye: Right=S−E

The image signal for a left eye: Left=S+E

As is understood from this expression, the sum signal produced by adding the image signal for a right eye and the image signal for a left eye becomes as follows.

The sum signal=(S+E)+(S−E)=S

As a result, the sum signal becomes equivalent to the input image.

In this manner, the sum signal becomes equal to, or substantially equal to the input signal.

Accordingly, the image displayed on a stereoscopic display apparatus allows the user to perceive the image stereoscopically when wearing glasses for stereovision, and to perceive the image as a usual two-dimensional image when not wearing glasses for stereovision. That is to say, it becomes possible to appreciate the image regardless of whether or not wearing the glasses. Also, by an image conversion apparatus according to the present invention, the disparity between the images for right and left eyes are very small, and thus it is possible to reduce fatigue of the observer when wearing glasses for stereovision.

2. Image Processing Apparatus, According to a Second Embodiment of the Present Invention, Including Detection of a Specific Image Area and the Control Processing Next, a description will be given of an example of an image processing apparatus detecting a specific image area, and performs enhancement processing control in accordance with the feature of the image area on the basis of the detected information as an image processing apparatus according to a second embodiment of the present invention. In the above-described image processing apparatus 100 according to the first embodiment, the image conversion section 130 shown in FIG. 5 generates the differential signal of the luminance signal, and adds the differential signal to or subtracts the differential signal from the input signal so that the images for right and left eyes are generated.

The images for right and left eyes, generated by this processing, are subject to overshooting and undershooting in which the amplitude of the original signal is exceeded around the edges of the signal as shown in FIG. 7. The overshooting and the undershooting causes the observed image to have unnaturalness.

Also, a human being is said to be sensitive to a grayscale of flesh color. For example, a non-consumer video camera, etc., is sometimes provided with a function called "skin tone detail", which weakens the edge enhancement processing of a flesh-colored area. The image conversion section shown in FIG. 5 carries out high-frequency enhancement of the original signal, and thus there is a problem in that wrinkles, roughness, etc., of a flesh-colored area are enhanced when viewed stereoscopically.

In the second embodiment described below, in order to address these problems, an edge area and a flesh-colored area are detected from the input image to be processed, and the processing is performed for weakening the impact of the disparity enhancement signal around the edge area and the flesh-colored area. By this processing, it becomes possible to reduce the occurrence of overshooting and undershooting in the edge area, and to express a smooth skin.

The overall configuration of an image processing apparatus according to the present embodiment is the same as that of the image processing apparatus 100 shown in FIG. 1. That is to say, in the image processing apparatus 100, an image input section 110 receives a still image file output from a digital still camera, etc., and moving image data output from a camcorder, etc., and supplies them to a color-space conversion section 120.

The color-space conversion section 120 generates a luminance signal and a color difference signal from the input signal, and outputs the signals to the image conversion section 130. The image conversion section 130 generates the images for right and left eyes using the luminance signal and the color difference signal. The images for right and left eyes generated by the image conversion section 130 are input into a color-space inverse conversion section 140, is converted into a signal in accordance with the output signal, and is output to a display section through an image output section 150.

In the second embodiment, the image conversion section 130 has a different configuration as the configuration in FIG. 5 described in the first embodiment. A description will be given of the image conversion section 130 in the second embodiment with reference to FIG. 17. The image conversion section 130 extracts a spatial feature quantity of the input image signal, and performs different enhancement processing on the extracted feature quantity so as to generate the image for a right eye and the image for a left eye.

Figure 17:
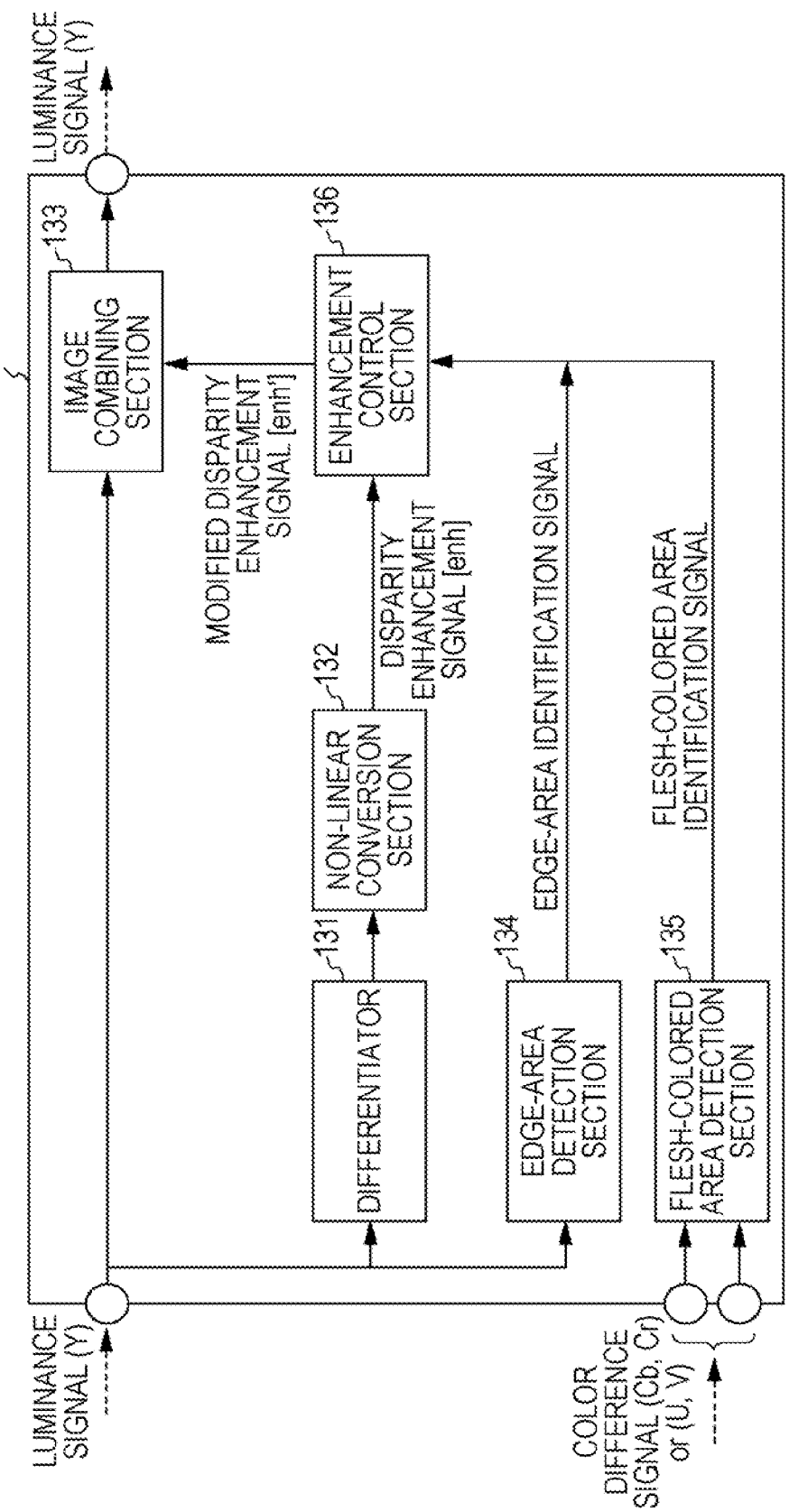
FIG. 17 is a diagram illustrating an example of the configuration of the image conversion section of an image processing apparatus according to an embodiment of the present invention.

As shown in FIG. 17, the image conversion section 130 according to the present embodiment includes a differentiator 131, a non-linear conversion section 132, an image combining section 133, an edge-area detection section 134, a flesh-colored area detection section 135, and an enhancement control section 136.

In the same manner as the differentiator 131 described in the first embodiment with reference to FIG. 5, the differentiator 131 extracts a luminance signal, for example, from the video data input into the image conversion section 130, and generates a differential signal of the luminance signal. Specifically, for example, the luminance signal of the image is input horizontally, and the first derivative signal of the input luminance signal is generated. The first derivative processing uses, for example, a linear first derivative filter having three taps in the horizontal direction.

In the same manner as the non-linear conversion section 132 described in the first embodiment with reference to FIG. 5, the non-linear conversion section 132 non-linearly converts the differential signal output from the differentiator 131, and outputs a disparity enhancement signal.

In the same manner as the image combining section 133 described in the first embodiment with reference to FIG. 5, the image combining section 133 receives the disparity enhancement signal output from the non-linear conversion section 132 and the video data input into the image conversion section 130, combines each frame image included in the video data and the disparity enhancement signal, and performs processing generating images for a right eye and for a left eye.

The edge-area detection section 134 generates an edge-area identification signal identifying an edge area and a smooth area from the video data input into the image conversion section 130. Specifically, for example, the edge-area detection section 134 extracts the luminance signal of each pixel from the input video signal, calculates the variance value of the surrounding area in order to obtain the degree of smoothness in the surrounding area of the luminance signal, and outputs the calculated variance value as the edge-area identification signal corresponding to the pixel. It is possible to determine whether an area is an edge area or a smooth area depending on the value of the variance. In this regard, the signal calculated and output by the edge-area detection section 134 is not limited to the variance value, and may be any signal that can distinguish an edge area from a smooth area.

The flesh-colored area detection section 135 generates and outputs a flesh-colored area identification signal identifying a flesh-colored area from the video data input into the image conversion section 130. Specifically, the flesh-colored area detection section 135 extracts a color difference signal from the input video signal, detects a flesh-colored area of a person on the basis of the comparison between the color difference signal and a preset threshold value, and outputs a flesh-colored area identification signal for each pixel specifying a flesh-colored pixel as "1", and a non-flesh colored pixel as "0".

The color difference signal input into the flesh-colored area detection section 135 is a color difference signal, such as (Cb, Cr) or (U, V), etc. The flesh-colored area detection section 135 holds threshold value data for identifying flesh color corresponding to the input color difference signal, compares the threshold value data and the input color difference signal for each pixel, and determines whether each pixel is a flesh-colored pixel or not.

In this regard, the detection of a flesh-colored area in the flesh-colored area detection section 135 is possible by the above-described simple comparison processing between the color difference signal and the threshold value. However, the detection is not limited to this method, and a method of detecting a flesh-colored area more correctly may be used using face detection and human-body detection technique.

The enhancement control section 136 receives the disparity enhancement signal [enh E] output from the non-linear conversion section 132, the edge-area identification signal (for example, the variance value) output from the edge-area detection section 134, and the flesh-colored area identification signal (for example, the identification signal of "0" or "1") output from the flesh-colored area detection section 135, and performs gain control processing on the disparity enhancement signal [enh E] in accordance with the edge-area identification signal and the flesh-colored area identification signal.

The variance value, which is the edge-area identification signal output from the edge-area detection section 134, is a signal which becomes large in an area having a great change in the luminance, such as an edge, and becomes small in a smooth area.

As described above, the image conversion section 130 having the configuration, shown in FIG. 5, of the first embodiment is subject to overshooting and undershooting in which the amplitude of the original signal is exceeded around the edges of the signal as shown in FIG. 7. In order to address this problem, in the present embodiment, the impact of the disparity enhancement signal is strengthened in a smooth area having a little change in the pixel value, and the impact of the disparity enhancement signal is weakened around the edge having a great change in the pixel value, thereby reducing the occurrence of overshooting and undershooting. Accordingly, the enhancement control section 136 calculates the amount of gain [$gain_{flat}$] corresponding to an edge given by the following inverse proportional expression (Expression-10), and controls the impact of the disparity enhancement signal by multiplying the disparity enhancement signal by the amount of gain.

$$gain_{flat} = \begin{cases} \text{clip}\left(\frac{a}{\text{var}}, 1\right), & \text{var} \neq 0 \\ 1, & \text{var} = 0 \end{cases} \quad \text{(Expression-10)}$$

In the above-described expression (Expression-10), var is a normalized variance value, and a is a proportionality constant.

When var is not 0, the amount of gain [$gain_{flat}$] corresponding to an edge is clipped at a maximum value [1]. When var is 0, the amount of gain [$gain_{flat}$] becomes [1]. The amount of gain [$gain_{flat}$] corresponding to an edge is not limited to the conversion by the above-described expression. A different conversion expression may be applied as long as a conversion having a characteristic of becoming strengthened in a smooth area, and becoming weakened around the edge.

The flesh-colored area identification signal output from the flesh-colored area detection section 135 is a signal which becomes "1" only in a flesh-colored area. A human being is said to be sensitive to a grayscale of flesh color. A non-consumer video camera, etc., is sometimes provided with a function called "skin tone detail", which weakens the edge enhancement processing of a flesh-colored area. As described above, the image conversion section 130 having a configuration shown by the first embodiment in FIG. 5 carries out high-frequency enhancement of the original signal, and thus there is a problem in that wrinkles and roughness of a flesh-colored area are enhanced when viewed stereoscopically. In the present embodiment, in order to address this problem, the impact of the disparity enhancement signal is weakened in a flesh-colored area so that a flesh-colored skin is expressed smoothly. Accordingly, the enhancement control section 136 calculates the amount of gain [$gain_{flat}$] corresponding to flesh color given by the following inverse proportional expression (Expression-11), and controls the impact of the disparity enhancement signal by multiplying the disparity enhancement signal by the amount of gain.

$$gain_{flat} = \text{clip}\left(\frac{b}{\frac{1}{n}\sum_{i=0}^{n} skin_i}, 1\right) \quad \text{(Expression-11)}$$

In the above-described expression (Expression-11), $skin_i$ is a flesh-colored area identification signal at a pixel position$_i$, and b is a proportionality constant.

In this manner, the amount of gain [$gain_{skin}$] corresponding to flesh color is inversely proportional to the average value of the flesh-colored area identification signals of the surrounding n pixels, and is clipped at a maximum value of 1. Here, the amount of gain [$gain_{skin}$] corresponding to flesh color is not limited to the conversion by the above-described expression, and a different conversion expression may be applied as long as a conversion having a characteristic of becoming weakened in a flesh-colored area.

As shown in the following expression (Expression-12), the enhancement control section 136 multiplies the disparity enhancement signal [enh], input from the non-linear conversion section 132, by the amount of gain [$gain_{flat}$] corresponding to an edge given by the above-described expression (Expression-10), and the amount of gain [$gain_{skin}$] corresponding to flesh color given by the above-described expression (Expression-11) to output a gain-controlled modified disparity enhancement signal [enh'].

$$enh'=enh \times gain_{flat} \times gain_{skin} \quad \text{(Expression-12)}$$

The above-described modified disparity enhancement signal [enh'] is calculated for each pixel on the basis of the amount of gain [$gain_{flat}$] corresponding to an edge for each pixel and the amount of gain [$gain_{skin}$] corresponding to flesh color.

In this manner, the enhancement control section 136 of the image conversion section 130 shown in FIG. 17 calculates the modified disparity enhancement signal [enh'], and outputs the modified disparity enhancement signal [enh'] to the image combining section 133.

The processing of the image combining section 133 is the same as the processing of the image combining section 133 in the first embodiment described before. The image combining section 133 receives the modified disparity enhancement signal [enh'] output from the enhancement control section 136 and the video data input into the image conversion section 130, combines each frame image included in the video data and the disparity enhancement signal, and performs processing generating images for a right eye and a left eye.

The image combining section 133 receives the video data S corresponding to the input signal (a) and the modified disparity enhancement signal [enh'] having the modification (enhancement controlled) for each image area on the disparity enhancement signal [enh E] produced by non-linearly converting the differential signal (b), and generates the image signal for a right eye, Right, and the image signal for a left eye, Left by the following expression.

$$Right=S-E'$$

$$Left=S+E'$$

Here, the image combining section 133 may not convert both the image signal for a right eye, Right, and the image signal for a left eye, Left, and may convert either one of the image signals. That is to say, the following combination may be used.

$$Right=S-E'$$

$$Left=S$$

Alternatively, the following combination may also be used.

$$Right=S$$

$$Left=S+E'$$

By such processing, it is possible for the image signal for a right eye, Right, and the image signal for a left eye, Left, to produce an image generating retinal disparity of the user to give the perception of depth.

As described with reference to FIG. 17, in the present embodiment, the image conversion section 130 includes an edge-area detection section 134, a flesh-colored area detection section 135, and an enhancement control section 136, and calculates the modified disparity enhancement signal [enh'] in accordance with the image feature of the input image.

The enhancement control section 136 multiplies the disparity enhancement signal [enh E] input from the non-linear conversion section 132 by the amount of gain [$gain_{flat}$] corresponding to a small edge in an edge area, for example.

The enhancement control section 136 generates the modified disparity enhancement signal [enh' E'] having a smaller value in the edge area compared with a smooth area by this processing. By this processing, it becomes possible to restrain overshooting and undershooting that occurs around an edge in the images for right and left eyes output from the image combining section 133, and to obtain good image quality in stereovision. Further, it is possible to maintain the amount of disparity of the overall image by lowering the impact of the disparity enhancement signal [enh E] only around edges, and thus there is not a great impact on the overall sense of depth.

Also, the image conversion section 130 shown in FIG. 17 multiplies the disparity enhancement signal [enh E] input from the non-linear conversion section 132 by the amount of gain [$gain_{skin}$] corresponding to small flesh color for the flesh-colored area detected by the flesh-colored area detection section 135.

The enhancement control section 136 generates the modified disparity enhancement signal [enh' E'] having a smaller value in the flesh-colored area compared with the other area. By this processing, it becomes possible to restrain the enhancement of wrinkles, roughness, etc., of a flesh-colored area of a person's face, etc., in the images for right and left eyes, output by the image combining section 133, and to obtain good image quality in stereovision.

3. Image Processing Apparatus, According to a Third Embodiment of the Present Invention, Generating Right and Left Image Signals Corresponding to a Color Difference Signal Next, a description will be given of a configuration of an image processing apparatus generating images for right and left eyes corresponding to a color difference as a third embodiment of the present invention.

The overall configuration of an image processing apparatus according to the present embodiment is the same as that of the image processing apparatus 100 shown in FIG. 1. That is to say, in the image processing apparatus 100, an image input section 110 receives a still image file output from a digital still camera, etc., and moving image data output from a camcorder, etc., and supplies them to a color-space conversion section 120.

The color-space conversion section 120 generates a luminance signal and a color difference signal from the input signal, and outputs the signals to the image conversion section 130. The image conversion section 130 generates the images for a right eye and for a left eye using the luminance signal and the color difference signal. The images for right and left eyes generated by the image conversion section 130 are input into a color-space inverse conversion section 140, is converted into a signal in accordance with the output signal, and is output to a display section through an image output section 150.

In the third embodiment, the image conversion section 130 has a different configuration as the configuration in FIG. 5 described in the first embodiment. A description will be given of the image conversion section 130 in the third embodiment with reference to FIG. 18. The image conversion section 130 extracts a spatial feature quantity of the input image signal, and performs different enhancement processing on the extracted feature quantity so as to generate the image for a right eye and the image for a left eye.

Figure 18:
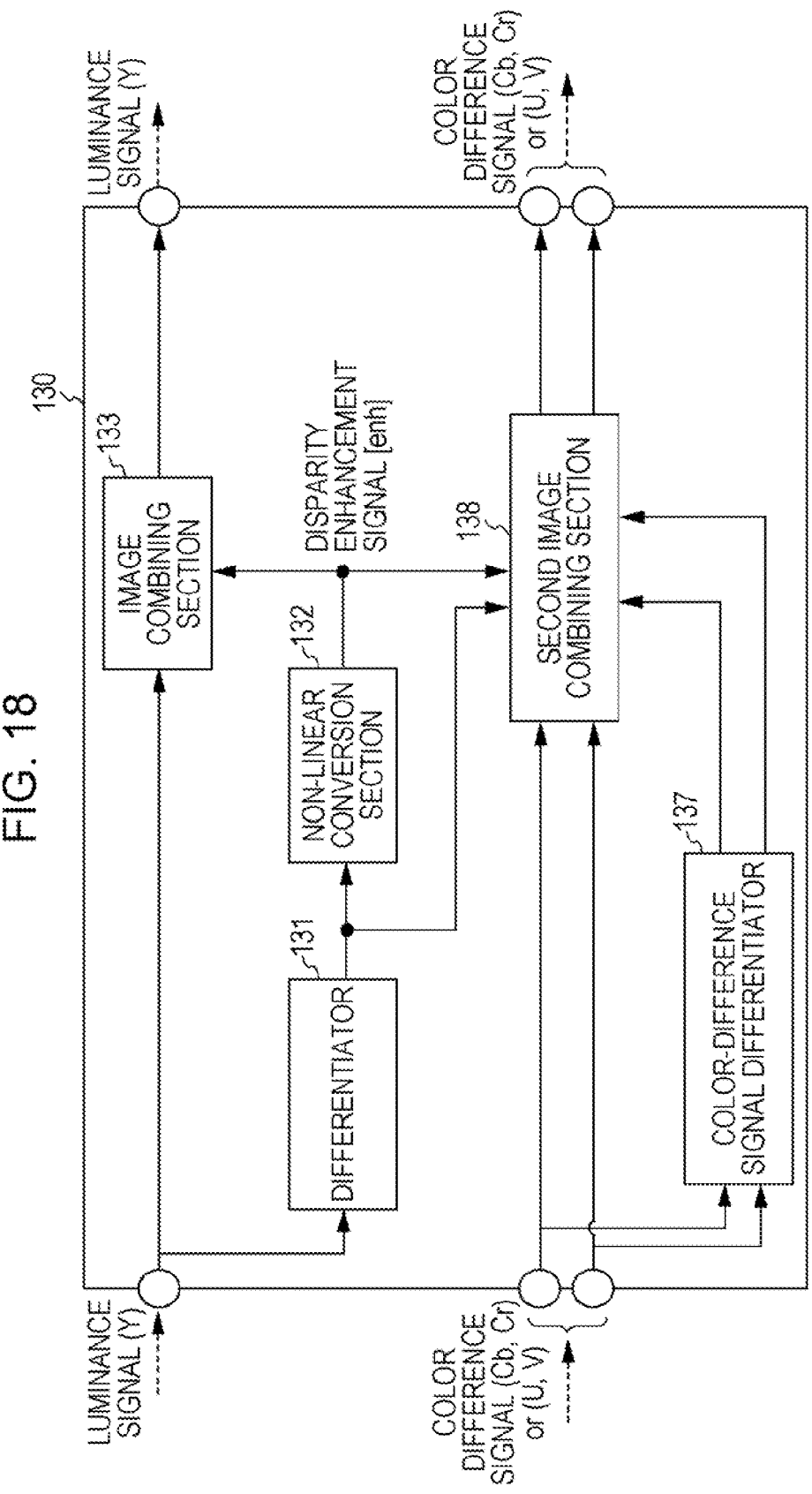
FIG. 18 is a diagram illustrating an example of the configuration of the image conversion section of an image processing apparatus according to an embodiment of the present invention.

As shown in FIG. 18, the image conversion section 130 according to the present embodiment includes a differentiator 131, the non-linear conversion section 132, the image combining section 133, a color-difference signal differentiator 137, and a second image combining section 138. The differentiator 131, the non-linear conversion section 132, and the image combining section 133 perform the same processing as that described with reference to FIG. 5. A description will be omitted of the processing.

The color-difference signal differentiator 137 extracts the color difference signals (Cb, Cr) or (U, V) from the video data input into the image conversion section 130, and generates differential signals for the individual color difference signals. The generation of the differential signals is the same as the generation of the differential signal for the luminance signal by the differentiator 131, and, for example, a linear first derivative filter having three taps in the horizontal direction is used.

The second image combining section 138 inputs the following individual signals.

(a) The differential signal [Dc] of the color difference signal output from the color-difference signal differentiator 137, (b) The color-difference signal [C] of the video data input into the image conversion section 130, (c) The differential signal of the luminance signal output from the differentiator 131, and (d) The disparity enhancement signal [enh E] output from the non-linear conversion section 132.

The second image combining section 138 receives these signals, combines the color difference signal of each frame image included in the video data and the differential signal of the color difference signal, and performs generation processing of the color difference signal between the image for a left eye and the image for a right eye. Specifically, the second image combining section 138 combines the differential signal [Dc] of the color difference signal and the color difference signal [C] of the video data by the following expression (Expression-13), and generates the color difference signal [Left$_c$] of the image for a left eye and the color difference signal [Right$_c$] of the image for a right eye.

$$Left_C = C + D_C \times \frac{enh}{D_y}$$
$$Right_C = C - D_C \times \frac{enh}{D_y}$$
(Expression-13)

In the above-described expression (Expression-13), the color difference signal C represents either channel (Cb or Cr) or (U or V) of the color difference signals.

The differential signal Dc is the differentiated value of the color difference signal C.

Also, Dy represents the differential signal of the luminance signal, and enh represents the disparity enhancement signal.

In this regard, if the color difference signals input into the image conversion section 130 is (Cb, Cr), the second image combining section 138 generates the color difference signal [Left$_c$] of the image for a left eye and the color difference signal [Right$_c$] of the image for a right eye, corresponding to the color difference signal Cb, and the color difference signal [Left$_c$] of the image for a left eye and the color difference signal [Right$_c$] of the image for a right eye, corresponding to the color difference signal Cr.

Also, if the color difference signals input into the image conversion section 130 is (U, V), the second image combining section 138 generates the color difference signal [Left$_c$] of the image for a left eye and the color difference signal [Right$_c$] of the image for a right eye, corresponding to the color difference signal U, and the color difference signal [Left$_c$] of the image for a left eye and the color difference signal [Right$_c$] of the image for a right eye, corresponding to the color difference signal V.

The above-described combination expression (Expression-13) determines the amount of enhancement by the ratio [enh/Dy] of the disparity enhancement signal [enh] of the luminance signal to the differential signal [Dy]. That is to say, the color difference signal [Left$_c$] of the image for a left eye is produced by adding the product [Dc×(enh/Dy)] of the ratio [enh/Dy] of the disparity enhancement signal [enh] to the differential signal [Dy] and the differential signal Dc to the original color difference signal C.

The color difference signal [Right$_c$] of the image for a right eye is produced by subtracting the product [Dc×(enh/Dy)] of the ratio [enh/Dy] of the disparity enhancement signal [enh] to the differential signal [Dy] and the differential signal Dc from the original color difference signal C.

In this regard, the above-described combination expression (Expression-13) is only an example of the combination processing performed by the second image combining section 138 according to the present embodiment. The second image combining section 138 may perform the combination processing other than the above-described expression as long as the color difference signal [Left$_c$] of the image for a left eye and the color difference signal [Right$_c$] of the image for a right eye are generated by the addition processing and the subtraction processing of the color difference signal and the differential signal thereof, respectively.

In this manner, in the image processing apparatus according to the present embodiment, the image conversion section 130, shown in FIG. 18, generates the differential signal of the color difference signal, performs combination processing with the original color difference signal, and individually generates the color difference signal [Left$_c$] of the image for a left eye and the color difference signal [Right$_c$] of the image for a right eye. With this configuration, it becomes possible to restrain the occurrence of false color and a color blur in the vicinity of the border of a subject having a high saturation. Further, it becomes possible to achieve enhancement of the same degree as the luminance signal by determining the amount of enhancement on the basis of the ratio of the disparity enhancement signal of the luminance signal and the differential signal.

A summarized description will be given of the processing of the image conversion section 130 shown in FIG. 18.

The processing of the differentiator 131, the non-linear conversion section 132, and the image combining section 133 in the image conversion section 130 shown in FIG. 18 are the same processing as the above-described first embodiment. That is to say, the differentiator 131 extracts the differential luminance signal of the input image signal, the non-linear converted section 132 performs non-linear conversion on the differential signal, and sets the result as a first feature quantity. The image combining section 133 generates either the converted signal produced by adding the first feature quantity to the luminance signal of the input image signal or the converted signal produced by subtracting the first feature quantity from the luminance signal of the input image signal as the luminance signal of the image for a left eye or the image for a right eye.

The color-difference signal differentiator 137, and the second image combining section 138 in the image conversion section 130 shown in FIG. 18 is the processing as follows. The color-difference signal differentiator 137 extracts the differential color difference signal of the input image signal, and sets the differential color difference signal as a second feature quantity. The second image combining section 138 generates either the converted signal produced by adding the second feature quantity to the color difference signal of the input image signal or the converted signal produced by subtracting the second feature quantity from the color difference signal of the input image signal as the color difference signal of the image for a left eye or the image for a right eye.

By such processing, the luminance signals and the color difference signals of the images for right and left eyes are obtained. In this regard, in addition to the above-described processing in which the luminance signals and the color difference signals of the images for right and left eyes are generated, the following processing may be used. The luminance signal and the color difference signal of only the image for one eye, either the image for a right eye or the image for a left eye, may be generated by the addition or the subtraction processing using the above-described feature quantity, and a non-converted signal being the direct input image signal may be set and output as the image for the other eye.

Figure 19:
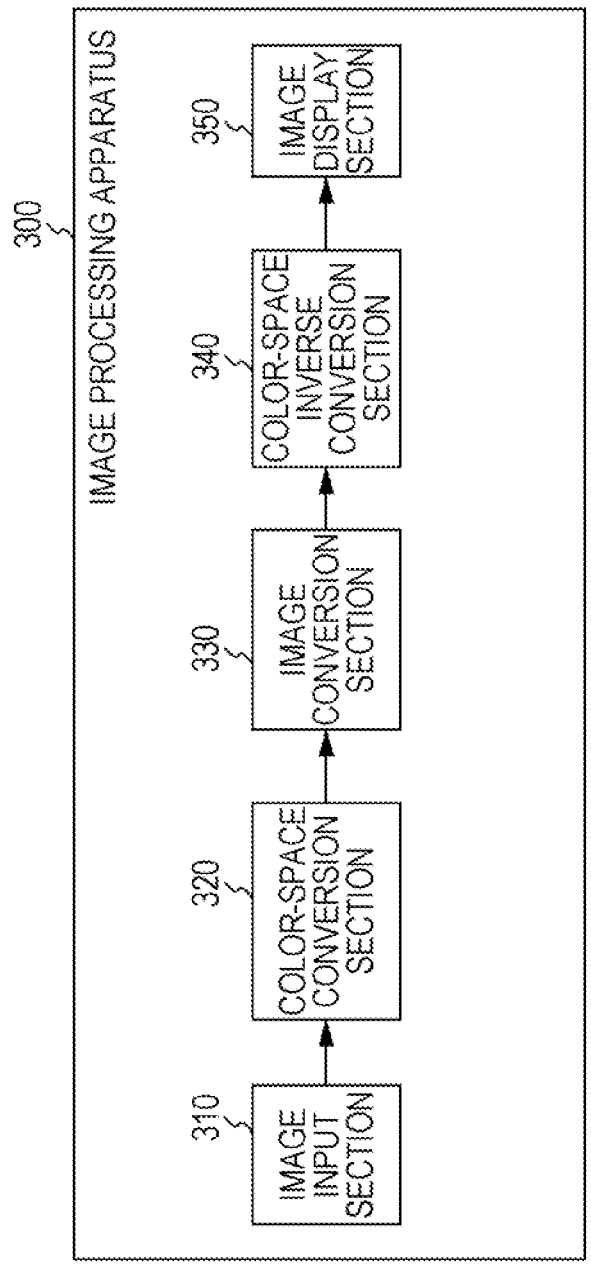
FIG. 19 is a diagram illustrating an example of a configuration of an image processing apparatus according to an embodiment of the present invention.

4. Example of the Configuration of an Image Processing Apparatus Having an Image Display Section A description has been given of the image processing apparatus shown in FIG. 1 as an image processing apparatus without having an image display section. However, the image processing apparatus may be configured to have an image display section. FIG. 19 is a diagram illustrating an image processing apparatus, having an image display section, according to an embodiment.

In the image processing apparatus 300, an image input section 310 receives a still image file output from a digital still camera, etc., and moving image data output from a camcorder, etc., and converts the file and the data into an internal data format. Here, the internal data format is moving image data of a baseband, and is video data of the three primary colors, red (R), green (G), and blue (B), or video data signals including a luminance (Y), color difference (Cb, Cr) or (Y, U, V). The identification signal of a color space is overlaid on the internal data format, so that any color space may be used as long as a color-space conversion section 320 in the subsequent stage corresponds to the color space.

The video data output from the image input section 310 is input into the color-space conversion section 320, and is converted into a luminance signal and color difference signals. At this time, if the input video data conforms to the processing data of the image conversion section, for example, conforms to the Y, Cb, Cr color space, the color-space conversion section 320 outputs the data without performing the conversion. If the input video data conforms to the R, G, B color space, or the other color spaces, the color-space conversion section 320 performs conversion to the luminance (Y) and the color differences (Cb, Cr) signals, and outputs the signals.

Here, the color space of the video data output from the color-space conversion section 320 is not limited to the Y, Cb, Cr color space. The color space may be any color space as long as a luminance component and a color component are separated.

The video data output from the color-space conversion section 320 is input into the image conversion section 330. The image conversion section 330 generates binocular disparity images for a right eye and for a left eye by the processing described before, and combines these images in accordance with the format of an image display section 350.

The video data output from the image conversion section 330 is input into a color-space inverse conversion section 340, and is converted from the Y, Cb, Cr color space to the R, B, G color space.

The video data output from the color-space inverse conversion section 340 is input into the image display section 350. The image display section 350 has a configuration including both an image output section and a display section. The image display section 350 performs image display by either stereoscopic display method (a time-division method or a space-division method) as shown below.

(Time-Division Method)

In a time-division stereoscopic display method, an odd-numbered frame and an even numbered frame of the input video data is recognized as an image for a left eye, and an image for a right eye (or an image for a right eye, and an image for a left eye), respectively. And glasses of a liquid-crystal shutter method, worn by a user, is controlled so that the image is presented to a left eye and to a right eye alternately in time. In this display method, the image display section 350 controls the output switching timing of the image for a left eye and the image for a right eye in synchronism with the switching of the shutter of the left and the right part of the glasses worn by the observer.

(Space-Division Method)

In a space-division stereoscopic display method, a polarizing filter, whose polarization direction is set different for each horizontal line, is attached on a front surface of the display, so that when the user views the image through glasses of a polarizing filter method, the video is presented to the user separately for right and left eyes for each horizontal line.

As described above, by an image processing apparatus according to the present invention, it is possible to input two-dimensional image data, and to generate pseudo images for right and left eyes from the feature quantity of the image in order to stereoscopically display the image using the binocular disparity. Further, by an image processing apparatus according to the present invention, the image conversion is performed such that the sum of the images for a right eye and a left eye becomes equivalent to the input image. Accordingly, the images allow the user to perceive the images stereoscopically when wearing glasses for stereovision, and to perceive the image as a usual two-dimensional image when not wearing glasses for stereovision. Thus, it becomes possible to appreciate the image regardless of whether or not wearing the glasses. Also, by an image conversion apparatus according to the present invention, the disparity between the images for right and left eyes are very small, and thus it is possible to reduce fatigue of the observer when wearing glasses for stereovision.

In this regard, descriptions have been given of a plurality of embodiments so far. However, a combination of individual embodiments may be employed as a configuration. That is to say, it is possible to make any combination of individual image processing apparatuses according to the first to the third embodiments, and the image processing apparatus having an image display section, and to configure an image processing apparatus having functions of individual embodiments, for example, an image processing apparatus having the functions of the combination of the second embodiment and the third embodiment.

The present invention has been explained in detail by referring to the specific embodiments. However, it is obvious that those skilled in the art can perform modifications and substitutions on the embodiments without departing from the spirit of the present invention. That is to say, the present invention has been disclosed in a form of an example, and should not be limitedly interpreted. In order to determine the gist of the present invention, the appended claims should be taken into account.

Also, the series of processing described in the specification can be executed by hardware or by software or by the combination of both of these. When the processing is executed by software, the programs recording the processing sequence may be installed in a memory of a computer built in a dedicated hardware. Alternatively, the various programs may be installed and executed in a general-purpose computer capable of executing various processing. For example, the programs may be recorded in a recording medium in advance. In addition to installation from a recording medium to a computer, the programs may be received through a network, such as a LAN (Local Area Network) and the Internet, and may be installed in a recording medium, such as an internal hard disk, etc.

In this regard, the various processing described in this specification may be executed not only in time series in accordance with the description, but also may be executed in parallel or individually in accordance with the processing ability of the apparatus executing the processing or as necessary. Also, a system in this specification is a logical set of a plurality of apparatuses, and is not limited to a set of constituent apparatuses that are contained in a same casing.

The present application contains subject matter related to that disclosed in Japanese Priority Patent Applications JP 2008-203614 and JP 2009-128578 filed in the Japan Patent Office on Aug. 6, 2008 and May 28, 2009, respectively, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an image conversion section inputting an image signal of an original signal, and generating and outputting images for right and left eyes for allowing binocular stereovision; and
an image output section outputting the images for right and left eyes output from the image conversion section,
wherein the image conversion section extracts a spatial feature quantity of the input image signal, and performs image conversion processing comprising applying the extracted spatial feature quantity to the input image signal so that either an image for a right eye or an image for a left eye is generated,
the extracted spatial feature quantity comprises one of: a differential luminance signal of the input image signal, or a signal produced by non-linearly converting the differential luminance signal,
the image conversion section generates a signal by at least adding the extracted spatial feature quantity to the input image signal,
due to adding the extracted spatial feature quantity to the input image signal, a simulated local depth perceived as a result of local retinal disparity between the images for right and left eyes is a function of local spatial frequency of the original image, such that the higher the local spatial frequency, the smaller the local retinal disparity becomes, and the lower the local spatial frequency, the larger the local retinal disparity becomes, wherein areas of higher spatial frequencies are stereoscopically perceived to be in front of areas of lower spatial frequencies; and wherein the local retinal disparity is a function of an annular frequency of the input image signal.

2. The image processing apparatus according to claim 1, wherein the differential luminance signal is the extracted spatial feature quantity, and the signal generated by the image conversion section is a converted image signal for a right eye or a left eye, and
wherein the image conversion section outputs a non-converted signal as the direct input image signal as an image signal for a different one of the eyes from the eye for which the converted signal is produced.

3. The image processing apparatus according to claim 1, wherein the differential luminance signal is the extracted spatial feature quantity, and the image conversion section further generates another signal by subtracting the extracted spatial feature quantity from the input image signal, thereby generating a pair of the two signals as a pair of images for a right eye and for a left eye.

4. The image processing apparatus according to claim 1, wherein the signal produced by non linearly converting the differential luminance signal is the extracted spatial feature quantity, and the image conversion section produces the generated signal as an image signal for a right eye or an image signal for a left eye.

5. The image processing apparatus according to claim 1, wherein the image conversion section generates an image for a right eye and an image for a left eye for each frame included in a moving image.

6. The image processing apparatus according to claim 5, further comprising an image output section outputting the images for right and left eyes, generated by the image conversion section, wherein the image output section outputs the image for a right eye and the image for a left eye, generated by the image conversion section, alternately at a speed two times an input-image frame rate.

7. The image processing apparatus according to claim 1, wherein the image conversion section alternately generates either an image for a right eye or an image for a left eye for each frame included in a moving image.

8. The image processing apparatus according to claim 1, wherein the image conversion section generates an image for a right eye and an image for a left eye for each frame included in a moving image, and performs generation processing of a binocular disparity image alternately including line data included in the generated images for right and left eyes.

9. The image processing apparatus according to claim 1, wherein the image conversion section performs generation processing of an image for a right eye and an image for a left eye so as to set a sum signal of the image for a right eye and the image for a left eye equal to the input signal, or approximately equal to the input signal such that viewing of the image for a right eye and the image for a left eye, without stereoscopic glasses, does not visually differ from viewing the original image.

10. The image processing apparatus according to any one of claims 1 to 9, further comprising an image display section displaying the image generated by the image conversion section.

11. The image processing apparatus according to claim 10, wherein the image display section performs time division stereoscopic display processing alternately outputting the image for a right eye and the image for a left eye.

12. The image processing apparatus according to claim 11, wherein, when the image display section performs time division stereoscopic display processing alternately outputting the image for a right eye and the image for a left eye, the image display section switches the display such that switching timing of outputting the image for a right eye and the image for a left eye is synchronized with switching of shutters of right and left glasses worn by an observer of the image.

13. The image processing apparatus according to claim 10, wherein the image display section has a configuration in which a polarizing filter whose polarization direction is set different for each horizontal line is attached on a front surface of the display section, and displays a binocular disparity image including line data alternately forming the image for a right eye and the image for a left eye generated by the image conversion section.

14. A method of processing an image in an image processing apparatus, comprising the steps of:
inputting a two-dimensional image signal of an original image;
converting the input image signal to generate images for right and left eyes for allowing binocular stereovision; and
outputting the images for right and left eyes, wherein the step of converting the input image signal comprises:
extracting a spatial feature quantity of the input image signal, and
performing image conversion processing comprising applying the extracted spatial feature quantity to the input image signal so that either the image for a right eye or the image for a left eye is generated,
wherein the extracted spatial feature quantity comprises one of: a differential luminance signal of the input image signal, or a signal produced by non-linearly converting the differential luminance signal,
the image conversion section generates a signal by at least adding the extracted spatial feature quantity to the input image signal, and
due to adding the extracted spatial feature quantity to the input image signal, a simulated local depth perceived as a result of local retinal disparity between the images for right and left eyes is a function of local spatial frequency of the original image, such that the higher the local spatial frequency, the smaller the local retinal disparity becomes, and the lower the local spatial frequency, the smaller the local retinal disparity becomes, wherein areas of higher spatial frequencies are stereoscopically perceived to be in front of areas of lower spatial frequencies; and
wherein the local retinal disparity is a function of an annular frequency of the input image signal.

15. A non-transitory computer readable medium comprising program code for causing a computer to perform steps comprising:
inputting a two-dimensional image signal of an original image;
converting the input image to generate images for right and left eyes for allowing binocular stereovision; and
outputting the images for right and left eyes, wherein the step of converting the input image comprises:
extracting a spatial feature quantity of the input image signal, and
performing image conversion processing comprising applying the extracted spatial feature quantity to the input image signal so that either the image for a right eye or the image for a left eye is generated,
wherein the extracted spatial feature quantity comprises one of: a differential luminance signal of the input image signal, or a signal produced by non-linearly converting the differential luminance signal,
the image conversion section generates a signal by at least adding the extracted spatial feature quantity to the input image signal, and
due to adding the extracted spatial feature quantity to the input image signal, a stimulated local depth perceived as a result of local retinal disparity between the images for right and left eyes is a function of local spatial frequency of the original image, such that the higher the local spatial frequency, the smaller the local retinal disparity becomes, and the lower the local spatial frequency, the larger the local retinal disparity becomes, wherein areas of higher spatial frequencies are stereoscopically perceived to be in front of areas of lower spatial frequencies; and
wherein the local retinal disparity is a function of an annular frequency of the input image signal.

* * * * *